(12) United States Patent
Pacchione et al.

(10) Patent No.: US 10,829,193 B2
(45) Date of Patent: Nov. 10, 2020

(54) METHOD FOR PRODUCING A STRUCTURAL COMPONENT

(75) Inventors: Marco Pacchione, Hamburg (DE); Paulin Fideu, Stade (DE)

(73) Assignee: Airbus Operations GmbH, Hamburg (DE)

( * ) Notice: Subject to any disclaimer, the term of this patent is extended or adjusted under 35 U.S.C. 154(b) by 245 days.

(21) Appl. No.: 14/006,559

(22) PCT Filed: Mar. 23, 2012

(86) PCT No.: PCT/EP2012/055223
§ 371 (c)(1),
(2), (4) Date: Nov. 19, 2013

(87) PCT Pub. No.: WO2012/127038
PCT Pub. Date: Sep. 27, 2012

(65) Prior Publication Data
US 2014/0087143 A1    Mar. 27, 2014

Related U.S. Application Data

(60) Provisional application No. 61/466,964, filed on Mar. 24, 2011.

(30) Foreign Application Priority Data

Mar. 24, 2011   (DE) .......................... 10 2011 006 032

(51) Int. Cl.
*B32B 37/04*   (2006.01)
*B64C 1/12*   (2006.01)
(Continued)

(52) U.S. Cl.
CPC ................ *B64C 1/12* (2013.01); *B21D 21/00* (2013.01); *B21D 22/022* (2013.01);
(Continued)

(58) Field of Classification Search
CPC ..... B32B 15/08; B32B 32/1866; B32B 37/04; B64C 1/12; B29D 99/001
(Continued)

(56) References Cited

U.S. PATENT DOCUMENTS 4,500,589 A  *  2/1985  Schijve ................. B29C 70/088
                                          428/213
4,657,717 A  *  4/1987  Cattanach ........... B29C 43/3642
                                          264/102

(Continued)

FOREIGN PATENT DOCUMENTS

| AT | 31158 | 3/1985 |
|---|---|---|
| DE | 19956394 | 6/2001 |

(Continued)

OTHER PUBLICATIONS

Jambu et al, Creep Forming of AlMgSc Alloys for Aeronautic and Space Applications, 2002, ICAS 202 Congress, retrivied Dec. 13, 2016 from public Internet http://www.icas.org/ICAS_ARCHIVE/ICAS2002/PAPERS/632.PDF.*

(Continued)

*Primary Examiner* — Scott W Dodds
(74) *Attorney, Agent, or Firm* — Greer, Burns & Crain, Ltd.

(57) ABSTRACT

A method for manufacturing a structural assembly comprising at least two assembly components interconnected by means of a thermoplastic plastics material, and useful in the field of aviation or space travel. First, a first assembly component and a second assembly component are provided and arranged so as to form an arrangement. Second, the arrangement is subjected to creep forming at a temperature which is selected in such a way that the thermoplastic plastics material melts at least in part during the creep forming so as to connect the first assembly component and the second assembly component. The invention further (Continued)

relates to structural assemblies, in particular for an aircraft or spacecraft, and to an aircraft or spacecraft comprising a structural assembly of this type.

10 Claims, 17 Drawing Sheets

(51) Int. Cl.
| | |
|---|---|
| B29D 99/00 | (2010.01) |
| B21D 22/02 | (2006.01) |
| B32B 38/18 | (2006.01) |
| B29C 70/84 | (2006.01) |
| B29C 73/10 | (2006.01) |
| B32B 15/08 | (2006.01) |
| B32B 15/20 | (2006.01) |
| B32B 7/12 | (2006.01) |
| B29C 65/48 | (2006.01) |
| B21D 21/00 | (2006.01) |
| B32B 38/16 | (2006.01) |
| B29K 101/12 | (2006.01) |
| B29C 51/00 | (2006.01) |
| B29C 65/00 | (2006.01) |
| B29C 65/50 | (2006.01) |
| B29C 70/08 | (2006.01) |

(52) U.S. Cl.
CPC ............ *B29C 65/481* (2013.01); *B29C 70/84* (2013.01); *B29C 73/10* (2013.01); *B29D 99/001* (2013.01); *B32B 7/12* (2013.01); *B32B 15/08* (2013.01); *B32B 15/20* (2013.01); *B32B 37/04* (2013.01); *B32B 38/1866* (2013.01); *B29C 51/002* (2013.01); *B29C 65/5057* (2013.01); *B29C 66/026* (2013.01); *B29C 70/088* (2013.01); *B29K 2101/12* (2013.01); *B32B 38/162* (2013.01); *B32B 2262/02* (2013.01); *B32B 2262/101* (2013.01); *B32B 2262/106* (2013.01); *B32B 2311/00* (2013.01); *B32B 2398/20* (2013.01); *B32B 2605/18* (2013.01); *Y02T 50/43* (2013.01); *Y10T 156/1002* (2015.01); *Y10T 428/24628* (2015.01); *Y10T 428/31678* (2015.04)

(58) Field of Classification Search
USPC .......................................................... 156/196
See application file for complete search history.

(56) References Cited

U.S. PATENT DOCUMENTS

| | | | | |
|---|---|---|---|---|
| 5,185,198 | A * | 2/1993 | Lefeber et al. ............ | 428/301.1 |
| 6,323,468 | B1 * | 11/2001 | Dabelstein .......... | B29C 65/3644 |
| | | | | 219/603 |
| 6,460,240 | B1 | 10/2002 | Kielies et al. | |
| 6,527,894 | B1 * | 3/2003 | Rocker et al. ................. | 156/182 |
| 6,849,150 | B1 * | 2/2005 | Schmidt ........................ | 156/285 |
| 7,052,573 | B2 * | 5/2006 | Pham et al. ................... | 156/286 |
| 2004/0050134 | A1 | 3/2004 | Jambu et al. | |
| 2009/0142610 | A1 | 6/2009 | Paschkowski et al. | |
| 2009/0263676 | A1 * | 10/2009 | Litzenberger et al. ....... | 428/626 |

FOREIGN PATENT DOCUMENTS

| | | |
|---|---|---|
| DE | 10047491 | 4/2002 |
| DE | 102005033992 | 4/2007 |
| DE | 102009018151 | 10/2010 |
| DE | 102010003903 | 10/2010 |
| EP | 0473843 | 3/1992 |
| EP | 0547664 | 12/1992 |
| EP | 0547864 A1 | 6/1993 |
| EP | 1103370 | 5/2001 |
| EP | 2075297 | 7/2009 |

OTHER PUBLICATIONS

International Search Report, dated Jul. 12, 2012.
German Office Action, dated Nov. 22, 2011.
European office action for corresponding patent application No. 16154858.1 dated Jul. 23, 2018.

* cited by examiner

METHOD FOR PRODUCING A STRUCTURAL COMPONENT

CROSS-REFERENCES TO RELATED APPLICATIONS

This application claims the benefit of the U.S. Provisional Application No. 61/466,964, filed on Mar. 24, 2011, and of the German patent application No. 10 2011 006 032.4 filed on Mar. 24, 2011, and of the international Patent Application No. PCT/EP2012/055223, filed Mar. 23, 3013, the entire disclosures of which are incorporated herein by way of reference.

FIELD OF THE INVENTION

The present invention relates to a method for manufacturing a structural assembly, in particular for aviation or space travel, to a method for manufacturing a semi-finished product and to a repair method for a structural assembly. The invention further relates to a semi-finished product for manufacturing a structural assembly, to a semi-finished product for repairing a structural assembly, to structural assemblies, in particular for an aircraft or spacecraft, and to an aircraft or spacecraft comprising a structural assembly of this type.

Although the present invention is applicable to structural assemblies in any technical fields, for example including in a wide range of constructions in which a lightweight construction is desired, the invention and the set of problems on which it is based are explained in greater detail in the following in relation to structural assemblies for aircraft or spacecraft, in particular for aircraft, but without limiting the invention to this effect.

BACKGROUND OF THE INVENTION

As is known, in aircraft and spacecraft it is generally desired to reduce the structural weight as much as possible without having to accept losses in the mechanical properties such as the load capacity and rigidity of the structure. Therefore, thin-walled aluminium shell constructions, reinforced with reinforcing members such as formers and stringers, have been used for a relatively long time in this field, for example for the fuselage of an aircraft. So as to take into account the requirements as regards good flow properties of an aircraft in flight, the skin of shells of this type is often curved in space nowadays, in other words in three spatial dimensions. In addition, in modern commercial aircraft, there are often high requirements on the precision with which a predetermined target geometry of the aircraft outer skin, for example determined by way of a simulation, is to be achieved during manufacture.

The shaping of the shell skin may for example be implemented by way of creep forming. DE 100 47 491 A1 and U.S. Pat. No. 7,217,331 B2 disclose a method for the creep forming of structures made of aluminium alloys under the action of heat, by way of which a resilience of the deformed structure, known as the "spring-back" effect, is to be prevented after the structure has been removed from the mould. By means of this known method, it is to be achieved that the moulds used for the deformation can already be provided with the desired final geometry of the structure. An expensive and complicated simulation of the "spring-back" to determine a deviating geometry of the moulds used is to be avoided.

Nevertheless, manufacturing multiple curved shell assemblies is still time-consuming and cost-intensive. Deforming skin members and reinforcing members for shell assemblies of this type, on the one hand, and fastening the reinforcing members to the skin members, on the other hand, in separate operations in each case, leads to a high expense for processing the workpieces and a very circuitous manufacturing process. It would be desirable to reduce the processing expense and the production time. If the skin members and reinforcing members are deformed separately, great expense is required so as to ensure that these assemblies can subsequently be interconnected in a precise fit. This situation would be worth improving.

SUMMARY OF THE INVENTION

It is one idea of the present invention to reduce the expense required to manufacture structural assemblies of this type and the number of method steps to be carried out for the manufacture. Further, a possibility is to be provided for repairing a structural assembly rapidly and cost-effectively but reliably.

According to the invention, a first method for manufacturing a structural assembly comprising at least two assembly components interconnected by means of a thermoplastic plastics material, in particular for aviation or space travel, comprises the following:

a first assembly component and a second assembly component are provided and arranged so as to form an arrangement; and the arrangement is deformed by creep forming; a temperature at which the creep forming takes place is selected in such a way that the thermoplastic plastics material (sometimes referred to herein simply as thermoplastic material) melts at least in part during the creep forming, so as to interconnect the first assembly component and the second assembly component.

A first structural assembly according to the invention, in particular for an aircraft or spacecraft, is preferably manufactured by a first method of this type. The structural assembly comprises a first assembly component and a second assembly component. In this context, the first assembly component and the second assembly component are interconnected by way of a thermoplastic plastics material which is arranged between the first and the second assembly component. Preferably, the thermoplastic plastics material thus forms a thin adhesive layer between the first and second assembly components, as opposed to a structural layer.

According to the invention, an aircraft or spacecraft comprising a first structural assembly of this type is further proposed.

According to the invention, a second method for manufacturing a structural assembly comprising at least two interconnected assembly components is further proposed, and may likewise be useful in particular for aviation or space travel. The method comprises the following:

a first assembly component and a second assembly component are provided, the second assembly component being in the form of a composite component comprising a matrix of a thermoplastic plastics material; in this context, reinforcing fibres, in particular glass fibres, carbon fibres or Zylon fibres, are preferably embedded in the matrix;

the first assembly component and the second assembly component are arranged so as to form an arrangement; and the arrangement is deformed by creep forming; the creep forming is carried out at a temperature which is selected in such a way that the thermoplastic plastics material of the matrix softens during the creep forming, without melting, making it possible to deform the second assembly component during the creep forming process.

The invention further provides a second structural assembly, in particular for an aircraft or spacecraft, which is preferably manufactured by the second method according to the invention. A structural assembly of this type comprises a first assembly component and a second assembly component. In this context, the second assembly component is in the form of a composite component comprising a matrix of a thermoplastic plastics material and is connected to the first assembly component.

The invention further provides an aircraft or spacecraft comprising a second structural assembly of this type.

According to the invention, a method for manufacturing a semi-finished product for producing a structural assembly is further provided. The semi-finished product can be subjected to creep forming so as to produce the structural assembly, and may be made use of in particular in the field of aviation or space travel. The semi-finished product comprises at least two layers of a material which can be deformed by creep forming, interconnected by means of a sheet of a thermoplastic plastics material. To manufacture the semi-finished product, the following is carried out:

a first layer and a second layer are prepared and arranged one on top of the other, so as to form a stack; and the stack is heated to a temperature which is selected in such a way that the thermoplastic plastics material melts at least in part, so as to interconnect the first layer and the second layer.

A semi-finished product according to the invention for manufacturing a structural assembly by subjecting the semi-finished product to creep forming, in particular for aviation or space travel, is preferably manufactured by a method of this type for manufacturing a semi-finished product, and comprises at least two layers of a material which can be deformed by creep forming. In this context, a sheet of a thermoplastic plastics material is arranged between the at least two layers, and preferably forms a thin adhesion layer.

According to the invention, a repair method is further provided for a structural assembly comprising a damaged spot. The repair method may in particular be made use of in the field of aviation or space travel, and comprises the following:

a doubler, comprising at least one layer of a material which can be deformed by creep forming and at least one sheet of a thermoplastic plastics material, is provided;

the doubler is arranged on the structural assembly in such a way that the doubler covers the damaged spot and that the sheet of the thermoplastic plastics material comes into contact with the structural assembly; and the doubler is heated to a temperature which is selected in such a way that the thermoplastic plastics material melts at least in part to connect the layer to the structural assembly.

According to the invention, a semi-finished product for repairing a structural assembly, in particular for aviation or space travel, is further provided, and is preferably made use of when carrying out the repair method according to the invention. The semi-finished product for repairing a structural assembly comprises at least a first layer of a material which can be deformed by creep forming. An exposed sheet of a thermoplastic plastics material is arranged on the first layer.

One idea behind the present invention is to be able, in the same process, to subject at least one assembly component or layer to creep forming by heating and simultaneously to process the thermoplastic plastics material at the temperature selected for the creep forming. During the processing of the thermoplastic plastics material, it may soften and/or melt at least in part, making it possible to deform the thermoplastic plastics material and also to produce permanent connections in the case where it melts at least in part.

Using this idea, the first and second assembly component or the first and second layer can be interconnected, and the arrangement formed by the assembly components or the stack formed by the layers can be deformed in the same process.

In accordance with this concept, another idea behind the present invention is also to connect the doubler to the component to be repaired in the same operation and to be able to adapt it to the geometry of this assembly simultaneously by deformation.

The connection is achieved by melting the thermoplastic material at least in part. During the manufacture of the structural assembly by the first method according to the invention, the necessary temperature is achieved during the creep forming process. As a result of the melting, the thermoplastic plastics material can come into close contact with surfaces of the assembly components, surfaces of the layers of the semi-finished product or surfaces of the damaged structural assembly and the layer of the doubler. When the arrangement comprising the first and second assembly components, the stack, or the doubler and the structural assembly comprising the damaged spot subsequently cools again, the thermoplastic plastics material can permanently interconnect the two assembly components, the layers of the semi-finished product, or the layer of the doubler and the structural assembly by resolidifying.

The invention thus advantageously brings about a reduction in the operations required for manufacturing the structural assembly, since the interconnection of the first and second assembly components and the deformation of the assembly components can take place in the same operation in the first manufacturing method according to the invention for a structural assembly. The expense of clamping processes, intermediate storage and processing is greatly reduced. The method according to the invention for manufacturing a semi-finished product for manufacturing a structural assembly makes it possible to connect individual layers of the semi-finished product and simultaneously to deform the semi-finished product, so as to be able to pre-shape it for the further processing. The repair method according to the invention makes it possible to repair damage to the structural assembly in a rapid and cost-effective manner. Prefabrication of a doubler which matches exactly in curvature and shape is not necessary. The doubler may instead be tailored on site from the semi-finished product according to the invention.

The connection of assembly components or layers which is provided according to the invention, by means of a thermoplastic plastics material by melting it, is also advantageous, since there are no solvents in the thermoplastic plastics material.

The ideas behind the invention further advantageously make it possible to produce deformed assembly components for a structural assembly which are matched to one another in a precise fit in terms of the shaping thereof by way of the shared deformation at the point where they are interconnected in the finished structural assembly. The invention makes it possible to produce a structural assembly which is formed by two deformable assembly components and in which a composite component comprising a plastics material matrix is deformed precisely and economically to match a target geometry of a first assembly component.

Structural assemblies according to the invention can be produced in a shorter time and thus also much more cost-effectively than known structural assemblies. Structural assemblies can be produced cost-effectively and time-efficiently from the semi-finished products according to the invention.

Advantageous embodiments, developments and improvements of the invention may be taken from the dependent claims and from the description referring to the drawings.

In accordance with a development of the first method according to the invention for manufacturing a structural assembly, and in accordance with a development of the first structural assembly according to the invention, the first assembly component or the second assembly component or both assembly components are formed at least in part from a metal, in particular from an aluminium magnesium alloy, also referred to as an AlMg alloy, or an aluminium magnesium scandium alloy, also referred to in the following as an AlMgSc alloy. In accordance with a development of the second method according to the invention for manufacturing a structural assembly and a development of the second structural assembly according to the invention, the first assembly component is formed at least in part from a metal, in particular from an aluminium magnesium alloy or an aluminium magnesium scandium alloy. Aluminium alloys of this type and in particular AlMgSc alloys are particularly well-suited to the method according to the invention for manufacturing a structural assembly, since they can undergo creep forming at higher temperatures than other aluminium alloys without the favourable, in particular mechanical, properties of the alloy being lost. This is because many conventional Al alloys acquire the hardness and rigidity thereof, inter alia, by way of thermal treatment, in such a way that they can subsequently no longer be heated to above approximately 170° C. without risking losing these properties. Creep forming of these alloys at temperatures of over 200° C. is therefore not an option, since a further thermal treatment would be necessary. In particular, creep forming of assembly components made of AlMg or AlMgSc alloys can take place in temperature ranges which also contain the processing temperatures of the thermoplastics which are preferred for connecting the first and second assembly components or for forming the matrix of the composite component.

In one embodiment of the method according to the invention for manufacturing a semi-finished product, and in one embodiment of the semi-finished products according to the invention, the first layer or the first layer and the second layer are formed at least in part from a metal, in particular from an aluminium magnesium alloy or an aluminium magnesium scandium alloy. Advantageously, in particular if AlMgSc alloys are used, the semi-finished product may be deformed as early as during the manufacture thereof or in subsequent further processing by creep forming, at temperatures which are favourable for processing and melting a suitable thermoplastic high-performance plastics material without the mechanical properties of the layers suffering from the thermal treatment. Thus, in a variant, the layers of the semi-finished product configured in this manner for manufacturing a structural assembly may also only be connected during the further processing of the semi-finished product into the end product by creep forming at appropriate temperatures. A doubler of a semi-finished product developed in this manner for repairing a structural assembly still retains the favourable mechanical properties thereof even when heated to the temperature required for the thermoplastic plastics material to melt, and this makes high-quality repair possible.

In accordance with a development of the repair method according to the invention, it is provided that the layer of the doubler is formed at least in part from a metal, in particular from an aluminium magnesium alloy or an aluminium magnesium scandium alloy, and that the repair method is used in particular for repairing a structural assembly which is formed at least in part from a metal, in particular from an aluminium magnesium alloy or an aluminium magnesium scandium alloy. For repair, a structural assembly made in particular of an AlMgSc alloy can be heated as a whole or in portions to the temperatures which are favourable for the thermoplastic material to melt, without this having a negative effect on the mechanical properties of the structural assembly.

In the context of the present application, nano structured aluminium magnesium scandium alloys are also a possibility for the AlMgSc alloys. In addition to the stated constituents, the aluminium magnesium scandium alloys may also comprise further alloy constituents which are not expressly mentioned here. Examples of AlMgSc alloys which may be considered for carrying out the present invention include the alloys KO8242 and KO8542, the alloys C557 and C586 from the aluminium manufacturer ALCOA Inc., and also the alloys referred to as Scalmalloy®. Aluminium magnesium scandium alloys other than those mentioned above may also be suitable for carrying out the method disclosed in the present application and for manufacturing the structural assemblies or semi-finished products disclosed herein.

In accordance with an improvement of the method according to the invention for manufacturing a semi-finished product, the stack for forming a semi-finished product having a curved geometry is subjected to creep forming during the heating. As a result, the semi-finished product manufactured in this manner already has favourable shaping for subsequent processing, but may also subsequently be subjected to a further creep forming process.

In an embodiment of the method according to the invention for manufacturing a structural assembly and an embodiment of the method according to the invention for manufacturing a semi-finished product, the creep forming takes place by way of a mould, which has a surface the geometry of which substantially corresponds to a surface geometry of the structural assembly to be manufactured when finished. This is advantageous because it is possible to dispense with an expensive simulation of the deformation process or expensive analyses to determine a mould geometry differing from the desired final geometry, as is required in the case where "spring-back" occurs.

In accordance with a development of the method according to the invention for manufacturing a structural assembly and a development of the method according to the invention for manufacturing a semi-finished product, the mould used for the shaping may be in the form of a male or a female mould. In this way, structural assemblies and semi-finished products of a wide range of geometries can be manufactured highly efficiently.

In accordance with a further embodiment of the method according to the invention for manufacturing a structural assembly, the arrangement is given a two-or three-dimensionally curved shape during the creep forming. In this context, the first and the second assembly component can be deformed simultaneously in one method step. This makes the manufacturing method even more efficient. However, if because of the arrangement, size or shape thereof the second assembly component does not require any deformation during the creep forming of the first assembly component, it is possible substantially only to deform the first assembly component.

An embodiment of the structural assemblies according to the invention provides that the first assembly component and/or the second assembly component are curved two- or three-dimensionally. In other words, the first and/or second assembly component are provided with a curvature along one or more spatial directions. Structural assemblies of this type are well-suited to use in modern aircraft or spacecraft having a complex external geometry.

In an embodiment of the semi-finished product according to the invention for manufacturing a structural assembly, and in accordance with an embodiment of the method according to the invention for manufacturing the semi-finished product, the semi-finished product is formed curved two- or three-dimensionally. As a result, it is advantageously pre-shaped for subsequent processing steps. However, the semi-finished product may also alternatively be in the form of planar material.

In an embodiment of the method according to the invention for manufacturing a structural assembly or of the method according to the invention for manufacturing a semi-finished product, a force and/or a pressure is applied to the arrangement or stack for the creep forming, for example by means of a vacuum bag or a counter mould. This makes it possible to configure the arrangement or stack precisely to the mould and keep it in the desired deformed shape during the heating, until the arrangement or the stack has been deformed permanently by creep.

In a further embodiment of the method according to the invention for manufacturing a structural assembly or of the method according to the invention for manufacturing a semi-finished product, the creep forming takes place in an autoclave or in a furnace. The use of an autoclave may be advantageous if a modern high-performance thermoplastic is used as the thermoplastic plastics material.

In accordance with a development of the semi-finished product according to the invention for manufacturing a structural assembly and in accordance with a development of the method for manufacturing a semi-finished product, the two layers of the semi-finished product are interconnected by means of the sheet of the thermoplastic plastics material. The semi-finished product can be handled more easily with connected layers, and this facilitates the further processing.

In a further development of the first method according to the invention for manufacturing a structural assembly, the thermoplastic plastics material is introduced between the first assembly component and the second assembly component as a sheet during the formation of the arrangement. In an embodiment of the first structural assembly according to the invention, the thermoplastic plastics material thus forms a sheet between the first and the second assembly component. This makes reliable, planar connection between the first and second assembly component possible in that the thermoplastic plastics material, which has melted at least in part and solidified upon cooling, adheres to surface portions which are as large as possible of the assembly components.

In a further development of the first method according to the invention for manufacturing a structural assembly, the thermoplastic plastics material is laid between the first assembly component and the second assembly component as a film or foil during the formation of the arrangement. In accordance with an embodiment of the method according to the invention for manufacturing a semi-finished product, the thermoplastic plastics material is laid between the first layer and the second layer as a film or foil during the formation of the stack. In this context, the thermoplastic plastics material can be produced in advance as a film or foil, and tailored appropriately to the structural assembly or semi-finished product to be produced depending on the requirements. A film or foil of this type may be advantageous for a consistent, constant thickness of the thermoplastic layer between the assembly components or the layers, for uniform melting of the thermoplastic plastics material, and for a uniform quality of the connection of the assembly components or layers. The thickness of the film or foil is preferably in a range of 0.1 mm to 0.6 mm, and more preferably in a range of 0.1 mm to 0.2 mm. In this context, the film or foil forms a pure adhesion layer for interconnecting the assembly components or layers.

Further, in an embodiment of the repair method according to the invention, when the doubler is being arranged on the structural assembly the thermoplastic plastics material is laid between the layer and the structural assembly as a film or foil, again resulting in the advantages just mentioned. Films or foils of this type may also be prefabricated for repair and be supplied already suitably tailored together with the layer or with a plurality of layers.

In accordance with a development of the first method according to the invention for manufacturing a structural assembly, before the arrangement is formed the first assembly component or the second assembly component is coated at least in portions with the thermoplastic plastics material. Alternatively, both assembly components may also be coated with the thermoplastic plastics material. In a corresponding embodiment of the method according to the invention for manufacturing a semi-finished product, before the stack is formed the first layer or the second layer or both layers are coated at least in portions with the thermoplastic plastics material. The coating may take place in particular by thermally spraying the thermoplastic plastics material onto the respective assembly component or layer. In this development, it is not necessary to lay a separate member, formed from the thermoplastic plastics material, between the assembly components or layers when forming the arrangement or stack. Instead, one or both assembly components or one or both layers are already provided with the desired thermoplastic sheet. This further facilitates handling when manufacturing the structural assembly or the semi-finished product and also reduces the large number of individual parts to be provided.

In a corresponding embodiment of the repair method according to the invention, before the doubler is arranged on the structural assembly the layer of the doubler is coated at least in portions with the thermoplastic plastics material. In this case too the coating may take place in particular by thermally spraying the thermoplastic plastics material onto the layer. The doubler comprising the coated layer can thus be handled more easily, and this may be found to be advantageous when repairing local damaged spots in structural assemblies, specifically when the damaged structural assembly cannot easily be brought into a workshop. In a corresponding semi-finished product for repairing a structural assembly, in a corresponding embodiment, the first layer is coated in this way, the coating forming the exposed sheet of the thermoplastic plastics material.

In an embodiment of the method according to the invention and of the structural assemblies according to the invention and of the semi-finished products according to the invention, a high-performance plastics material is used as the thermoplastic plastics material, in particular a polyaryletherketone (PAEK), a polyetheretherketone (PEEK), a polyetherketone (PEK), a polyetherimide (PEI) or a polyamideimide (PAI). High-performance thermoplastics of this type are well-suited to strongly mechanically loaded components such as structural assemblies of aircraft or spacecraft. Further, the processing temperatures of said plastics materials, for the softening and/or melting for deforming or connecting the assembly components or layers or for applying the doubler, are in a temperature range in which the mechanical properties of assembly components or layers made of AlMgSc alloys are not negatively affected and they may in particular also be subjected to creep forming without any "spring-back".

In an advantageous improvement of the method according to the invention and of the structural assemblies according to the invention and the semi-finished products according to the invention, reinforcing fibres, preferably glass fibres, carbon fibres or fibres of the material poly(p-phenylene-2,6-benzobisoxazol) which is known as Zylon®, referred to in the following as Zylon fibres, are embedded in the thermoplastic plastics material. A combination of these fibre types is also conceivable. The reinforcing fibres can also be embedded before forming the arrangement or stack, as early as during the pre-production of the film or foil of the thermoplastic material or the manufacture of the composite component comprising the thermoplastic matrix. However, the fibres may also for example be encased with the thermoplastic plastics material during the spraying of the thermoplastic material onto the first and/or second assembly component or the respective layer. In particular in the case of the repair method, it may be advantageous to embed the fibres in the thermoplastic plastics material even before the doubler is arranged on the structural assembly, for better handling. Alternatively, it is conceivable only to embed the reinforcing fibres in the thermoplastic during the heating or the creep forming by melting thereof. Reinforcing fibres of this type can greatly increase the mechanical properties of the finished structural assembly or the semi-finished product, for example the tensile strength thereof in the direction of the fibre extension, and also improve the damage tolerance of the structural assembly or semi-finished product. With this embodiment, when producing the layers from metal, in particular from an AlMgSc alloy, a semi-finished product in the form of a fibre metal laminate (FML) can also be produced, and is of a low weight and in particular has a high strength along a selectable fibre extension.

In a preferred embodiment of the first method according to the invention for manufacturing a structural assembly, surfaces of the first and/or second assembly component, which are brought into contact with the thermoplastic plastics material to connect the first and second assembly component, are pre-treated before forming the arrangement. In a corresponding embodiment of the method according to the invention for manufacturing a semi-finished product, surfaces of the first layer and second layer, which are brought into contact with the thermoplastic plastics material to connect the layers, are pre-treated before forming the stack. In accordance with a corresponding embodiment of the repair method according to the invention, before the doubler is arranged on the structural assembly, surfaces of the layer and the structural assembly, which are brought into contact with the thermoplastic plastics material to connect the layer to the structural assembly, are pre-treated. In this context, the pre-treatment takes place in such a way that the adhesion of the thermoplastic plastics material to the surfaces by melting and resolidifying the thermoplastic plastics material is increased by comparison with non-pre-treated surfaces. Preferably, for the pre-treatment the surfaces are initially cleaned and subsequently anodised. However, for the pre-treatment the surfaces may instead for example also be cleaned and subsequently provided with a conversion coating or with a sol gel sheet. In this way, the durability and reliability of the connection of the assembly components or layers can be further improved. Particularly durable repair of a damaged spot can be achieved.

In a development of the method according to the invention, during the pre-treatment, in a further step, a base coat (primer) is additionally applied to the surface or surfaces. Preferably, this base coating is provided after the anodising, the application of the conversion coating or the application of the sol gel sheet. This improves the adhesion of the thermoplastic plastics material to the surfaces even further.

In accordance with a further embodiment of the method according to the invention for manufacturing a structural assembly, of the method according to the invention for manufacturing a semi-finished product and of the repair method according to the invention, the temperature is selected in a range of 250° C. to 375° C., preferably in a range of 275° C. to 375 ° C., more preferably in a range of 275° C. to 325° C. At temperatures in this range, tensions in the arrangement, the stack or the doubler can be relaxed when they are subjected to creep forming. With heating to temperatures in this temperature range, a plurality of advantageous effects can simultaneously be achieved: resilience or "spring-back" of the arrangement, the stack or the doubler after the deformation process can be prevented by relaxing the tension; in particular when AlMgSc alloys are used, the favourable properties of this material are fully or largely maintained in this temperature range; in addition, suitable thermoplastic plastics materials can be melted so as to connect the layers or assembly components or to connect the layer of the doubler to the structural assembly. The lack of resilience, the fact that the material properties are maintained, and the simultaneous melting thus make it possible for example to manufacture a fully deformed structural assembly of two or more individual components in a highly efficient manner in a single method step. Furthermore, in the corresponding embodiment of the second method according to the invention for manufacturing a structural assembly, the thermoplastic matrix of a composite component can soften in this temperature range in such a way that the composite component can likewise be deformed, making it possible to manufacture two precisely matching deformed assembly components in one operation.

In an embodiment of the method according to the invention for manufacturing a structural assembly, during the creep forming the arrangement is exposed to the temperature for a period of ten minutes or longer, preferably for a period in the range of ten minutes to approximately three hours, and more preferably for a period in the range of approximately 30 minutes to two hours.

In an embodiment of the method according to the invention for manufacturing a semi-finished product, during the heating the stack is exposed to the temperature for a period of ten minutes or longer, and preferably for a period in the range of ten minutes to approximately three hours.

In a development of the repair method according to the invention, the doubler is exposed to the temperature for a period of ten minutes or more, and preferably for a period in the range of ten minutes to approximately three hours.

In an embodiment of the first method according to the invention for manufacturing a structural assembly, it is ensured that after the creep forming and melting at least in part of the thermoplastic plastics material the arrangement can cool down again, the thermoplastic plastics material becoming solid again and durably connecting the first and second assembly component to form the structural assembly.

In a development of the second method according to the invention for manufacturing a structural assembly, it is ensured that after the creep forming the arrangement can cool down again, the thermoplastic plastics material transitioning back from the softened but not melted state into the solidified state. In this way, the geometry of the composite components which is achieved after the deformation is fixed.

In an embodiment of the method according to the invention for manufacturing a semi-finished product, it is ensured that after the heating and melting at least in part of the thermoplastic plastics material the stack can cool down again, the thermoplastic plastics material solidifying and connecting the layers to form the semi-finished product.

In a development of the repair method according to the invention, after the thermoplastic plastics material is heated and melted, the doubler and optionally also a heated portion of the structural assembly to be repaired are cooled. When the thermoplastic plastics material solidifies, the doubler is reliably connected to the structural assembly.

In an embodiment of the second method according to the invention for manufacturing a structural assembly, after the creep forming, preferably after the cooling, the first and second assembly component are interconnected to form the structural assembly, for example by riveting or gluing.

In accordance with a preferred development of the methods according to the invention for manufacturing a structural assembly and in an embodiment of the structural assemblies according to the invention, the structural assembly is in the form of a shell assembly, in particular a fuselage shell or part of a fuselage shell of an aircraft or spacecraft, or a wing shell or part of a wing shell of an aircraft or spacecraft. In this context, the first assembly component forms a shell skin and the second assembly component forms a reinforcing member, in particular a stringer, for the shell skin. Precisely in shell assemblies of this type, a large number of individual components often have to be deformed and/or fixed to the shell skin. In this case, the invention makes particularly efficient manufacture possible.

In an embodiment of the method according to the invention for manufacturing a structural assembly and of the structural assembly according to the invention, the manufactured structural assembly may be concavely or convexly curved, it being possible for the second assembly component, for example a stringer, to be arranged on an externally or internally protuberant surface of the first assembly component, for example a shell skin.

In a further advantageous development of the method according to the invention for manufacturing a structural assembly and of the structural assemblies according to the invention, the first assembly component is formed from a semi-finished product comprising a plurality of layers of a material which can be deformed by creep forming, between which a sheet of a further thermoplastic plastics material is arranged, the composition of which corresponds to or differs from that of the thermoplastic plastics material. Reinforcing fibres, for example glass fibres, carbon fibres or Zylon fibres, may be embedded in the thermoplastic material between the layers. The layers may be produced from an AlMg or preferably from an AlMgSc alloy. With this development, it is possible for example to deform a fibre metal laminate (FML) which is used for the first assembly component, and also to deform and/or connect a second assembly component to this first assembly component in the form of a laminate, and this in turn ensures a very efficient production process.

In an embodiment of the first method according to the invention for manufacturing a structural assembly and of the first structural assembly according to the invention, the first assembly component and the second assembly component are each in the form of a layer of a laminate, the thermoplastic material being arranged between the layers when forming the arrangement and preferably extending between the layers as a sheet after being arranged. Preferably, reinforcing fibres, such as glass fibres, carbon fibres or else Zylon fibres, may be embedded in the sheet formed from the thermoplastic plastics material, it being possible for the reinforcing fibres to be embedded in the thermoplastic plastics material before the arrangement is even formed, or only during the creep forming.

In accordance with a development of the first method according to the invention for manufacturing a structural assembly and in an embodiment of the first structural assembly according to the invention, the second assembly component is in the form of a composite component comprising a matrix of the thermoplastic plastics material. In this context, reinforcing fibres, in particular glass fibres, carbon fibres or Zylon fibres, are embedded in the matrix. This embedding preferably takes place before the arrangement is formed. During the creep forming, the matrix of the second assembly component melts at least in part for a connection to the first assembly component. By means of this development of the method, it is also possible to manufacture a structural assembly in which the second assembly component is produced from a fibre-reinforced plastics material. Advantageously, the second assembly component is configured in such a way that no additional thermoplastic plastics material, for example in the form of a foil or coating, needs to be provided for connecting the first and second assembly component. Composite components made of thermoplastic plastics materials can be manufactured with complex geometries, and make it possible to produce structural assemblies having a comparatively low inherent weight.

In an improvement of the aforementioned embodiment of the first method according to the invention for manufacturing a structural assembly, a device is provided which ensures that the second assembly component in the form of a composite component substantially maintains the cross-sectional shape thereof during the creep forming at the temperature. In this way, the composite component can be connected to the first assembly component by melting at least part of the matrix, without the composite component additionally deforming in an undesirable manner.

In an alternative development of the first method according to the invention for manufacturing a structural assembly and in an embodiment of the first structural assembly according to the invention, the second assembly component is in the form of a composite component comprising a matrix of a second thermoplastic plastics material. In this context, reinforcing fibres, in particular glass fibres, carbon fibres or Zylon fibres, are preferably embedded in the matrix. The second thermoplastic plastics material of the matrix softens during the creep forming without melting, in such a way that deformation of the second assembly component is made possible during the creep forming. In this development, the second assembly component in the form of a composite component can be deformed together with the first assembly component, without the matrix of the second assembly component being melted for connection to the first assembly component. As a result, it can advantageously be ensured that the geometry of the second assembly component, in particular the cross-sectional shape thereof, is not changed more than desired during the creep forming. This embodiment makes it possible to manufacture a structural assembly by deforming two assembly components, one of which is in the form of a composite component, and simultaneously to connect these assembly components, in a single step. As a result, even more efficient production of low-weight structural assemblies is possible.

In a development of the first method according to the invention for manufacturing a structural assembly and in a development of the first structural assembly according to the invention, the second assembly component is formed from steel or titanium. For example, reinforcing members, fastening members, clasps or the like, which require substantially no deformation during the creep forming itself because of the relatively small size thereof by comparison with the first assembly component, can be connected to the first assembly component during the creep forming. As a result, the method makes possible even more time-efficient and cost-effective production, and at the same time reliable fastening of components of this type.

In a further embodiment of the methods according to the invention for manufacturing a structural assembly and in a further embodiment of the structural assemblies according to the invention, the second assembly component is in the form of a doubler, in particular for locally reinforcing a shell skin, or in the form of a window frame. The doubler or the window frame may be produced from an aluminium magnesium alloy or preferably from an aluminium magnesium scandium alloy. Doublers or window frames of this type may also advantageously undergo creep forming together with the first assembly component at a temperature favourable to the melting of the thermoplastic plastics material. Further, in a variant the doubler or the window frame may also be in the form of a composite component comprising a matrix and made of a thermoplastic plastics material, and in an embodiment of the second method according to the invention for manufacturing a structural assembly can be deformed in the same step as the first assembly component. Further, in a variant the doubler or the window frame may also be in the form of a composite component comprising a matrix and made of a thermoplastic plastics material, and in an embodiment of the second method according to the invention for manufacturing a structural assembly can be deformed in the same step as the first assembly component.

In accordance with a preferred embodiment of the method according to the invention for manufacturing a structural assembly, before the creep forming at least a third assembly component, in particular a stringer, is connected to the first assembly component by a welding method, in particular by a laser beam welding method. The third assembly component, which is permanently connected in this manner to the first assembly component, for example a shell skin, is preferably also deformed during the subsequent creep forming to the extent required for the desired geometry of the finished structural assembly. In accordance with a preferred embodiment of the structural assemblies according to the invention, the structural assembly comprises, in addition to the first and the second assembly component, at least a third assembly component, in particular a stringer, which is welded to the first assembly component, in particular by a laser beam welding method. The third assembly component which is permanently connected in this manner to a first assembly component, for example a shell skin, is preferably also formed two- or three-dimensionally curved. In turn, in particular as a result of the possibility of connecting the first and second assembly component and simultaneously deforming the first, second and third assembly component, a time-efficient production method is achieved.

In an advantageous improvement of the repair method according to the invention, the doubler may comprise a plurality of layers, between which an intermediate sheet formed with the thermoplastic material is arranged in each case. In a corresponding embodiment of the semi-finished product according to the invention for repairing a structural assembly, said semi-finished product may comprise a plurality of layers, an intermediate sheet formed with the thermoplastic plastics material being provided between every two layers. The doubler can be tailored from this semi-finished product. The layers of the semi-finished product for the doubler can be interconnected by means of the thermoplastic plastics material.

In an embodiment of the repair method according to the invention, the doubler undergoes creep forming during the heating, so as to give the doubler a geometry matched to the structural assembly. This makes it possible to connect the layer of the doubler in a planar manner to the structural assembly. In this context, after the creep forming the connected layer preferably substantially follows the surface shape of the structural assembly. In this way, the undamaged surface shape of the structural assembly can be at least approximately reproduced.

In accordance with a development of the repair method according to the invention, the doubler and preferably also a portion of the structural assembly including the damaged spot are heated to the temperature by means of a mobile heating device. A repair method of this type can advantageously be carried out even outside a workshop.

In an embodiment of the repair method according to the invention, the structural assembly to be repaired is a fuselage shell or a wing shell of an aircraft or spacecraft.

The repair method according to the invention can advantageously be carried out on an aircraft, for example during routinely provided maintenance periods. In particular, relatively minor damage for example to the aircraft outer skin can be repaired by the method according to the invention with little expenditure of time.

The above embodiments can be combined with one another as desired, within reason. Further possible embodiments, developments and implementations of the invention also comprise combinations which are not explicitly stated of features which are disclosed in the above or in the following with regard to the embodiments. In particular, in this context the person skilled in the art will also add individual aspects as improvements or supplements to the respective basic form of the invention.

BRIEF DESCRIPTION OF THE DRAWINGS

In the following, the invention is described in greater detail by way of embodiments, referring to the appended schematic drawings.

In the drawings.

In the drawings, like reference numerals denote like or functionally equivalent components, unless specified otherwise.

DETAILED DESCRIPTION OF THE PREFERRED EMBODIMENTS

Figure 1A:
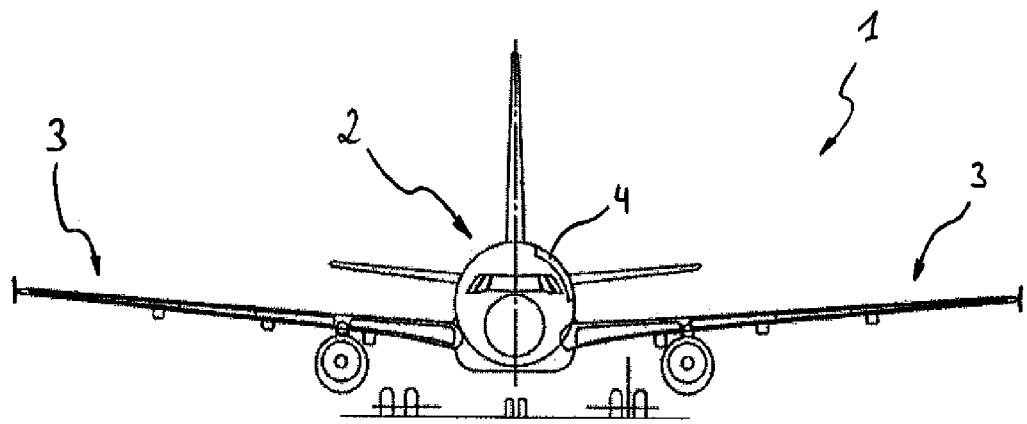
FIGS. 1A, B are a front view and a plan view of an aircraft.
Figure 1B:
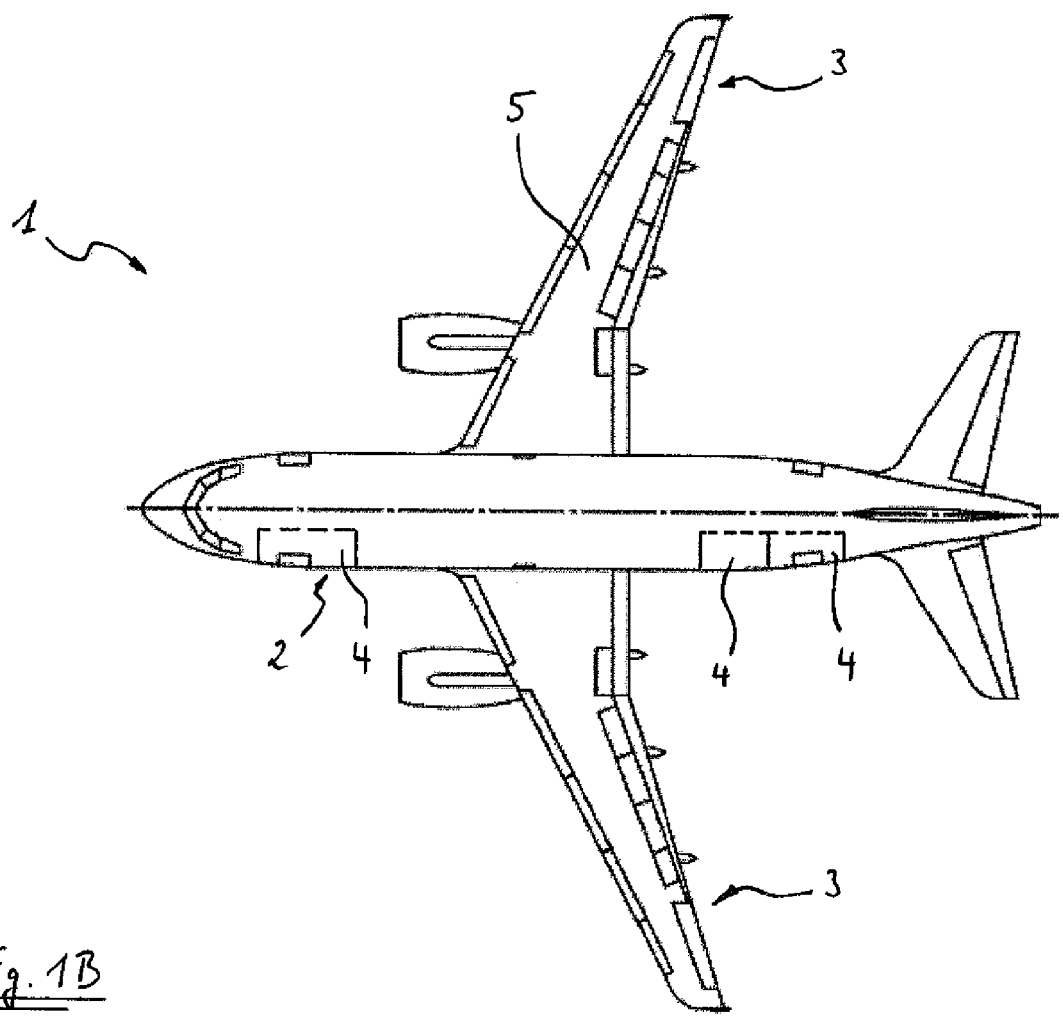

FIGS. 1A and 1B are a front view and a plan view of an aircraft 1, in this case a modern commercial aircraft. The aircraft 1 comprises a fuselage 2, on which wings 3 are arranged on both sides. Large parts of the fuselage 2 and the wings 3 are composed of shell components comprising a relatively thin shell skin. The application of reinforcing members, in particular of stringers and formers (not visible in FIGS. 1A and 1B), to the inside of the shell component has an influence on the rigidity and the resistance to denting and buckling of the shell skin. For example, FIG. 1B shows a plurality of fuselage shells 4 and a wing shell 5, the sizes and shapes thereof being able to vary in particular as a function of the manufacturing possibilities and the type of aircraft, and which are shown here by way of example purely for illustration. It is clear from FIGS. 1A and 1B that fuselage shells 4 and wing shells 5 may be curved not just in one direction, but in a plurality of directions in space. In other words, the shell assemblies 4, 5 may be curved not only cylindrically, but also spherically.

Figure 2A:
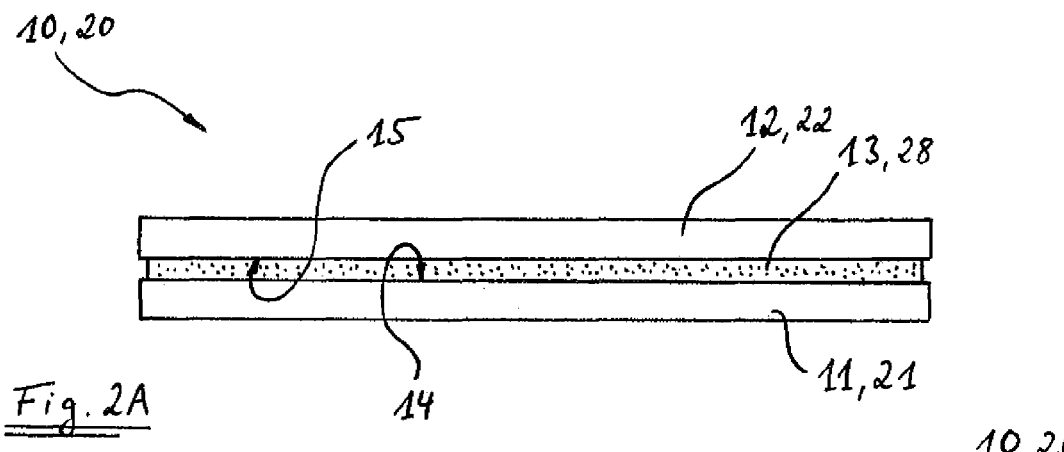
FIGS. 2A-C are sectional views of the manufacture of a structural assembly or a semi-finished product in accordance with a first embodiment of the invention.
Figure 2B:
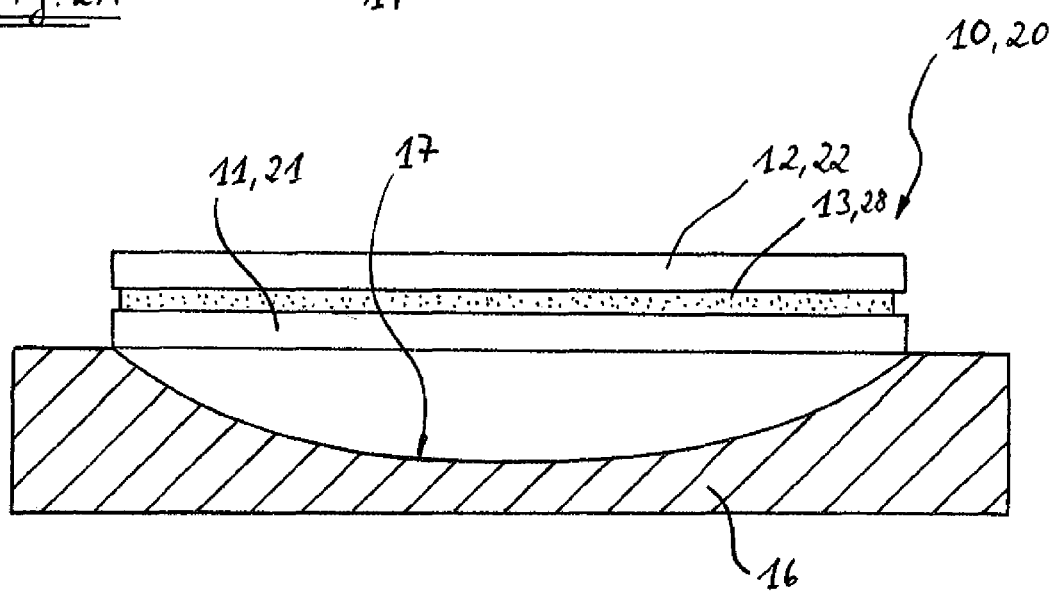
Figure 2C:
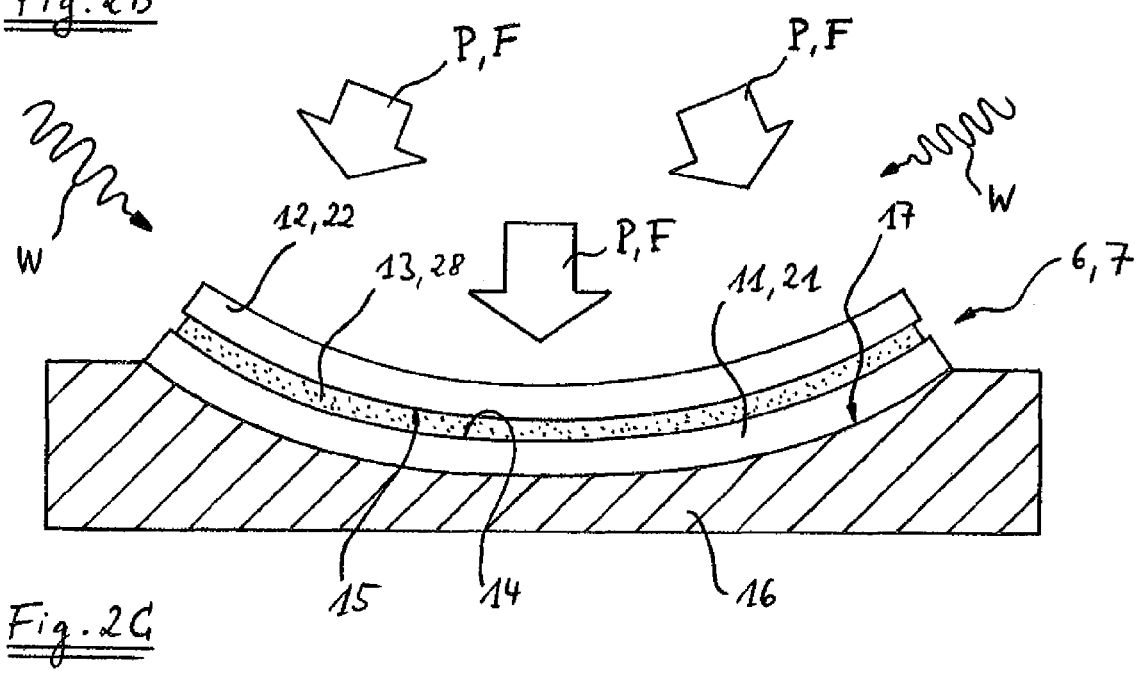

FIGS. 2A to 2C show the manufacture of a structural assembly 6 and a semi-finished product 7 in accordance with a first embodiment of the invention. The structural assembly 6 may be a wing shell 5 or a fuselage shell 4 of the aircraft 1, but may also be any other structural assembly from the field of air or space travel or else from other technical fields, for example motor vehicle or construction technology.

Figure 4:
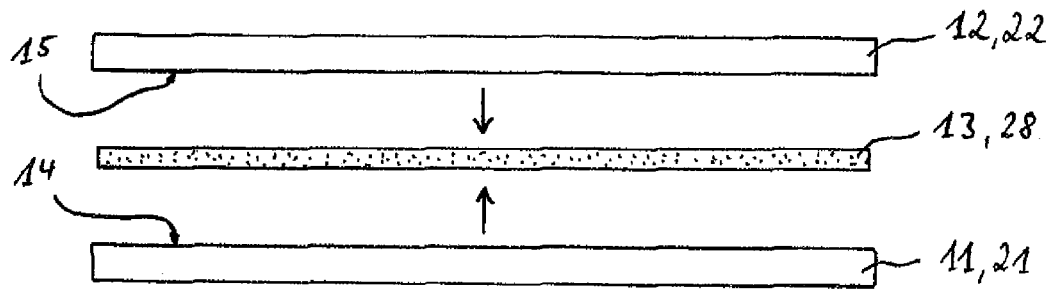
FIG. 4 is a sectional view of a film or a foil of a thermoplastic plastics material being laid between two assembly components or two layers of a material which can be deformed by creep forming.
Figure 5:
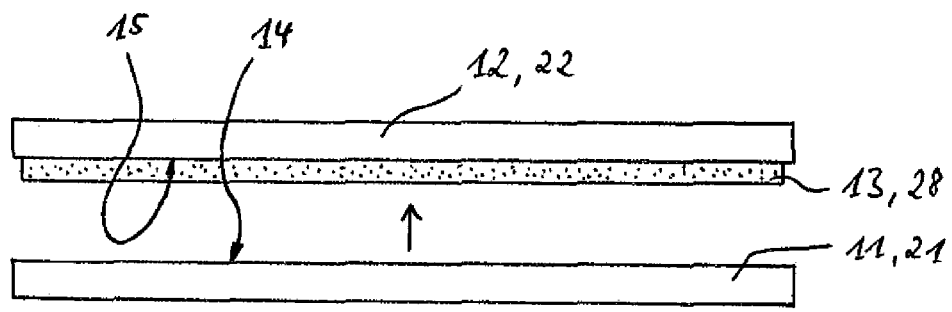
FIG. 5 is a sectional view of a second assembly component or a second layer of a material which can be deformed by creep forming being coated with a thermoplastic plastics material.
Figure 5A:
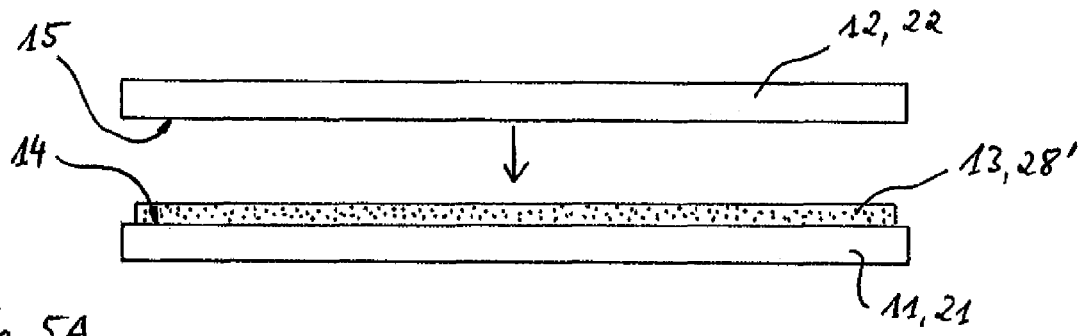
FIG. 5A is a sectional view of a first assembly component or a first layer of a material which can be deformed by creep forming being coated with a thermoplastic plastics material.
Figure 5B:
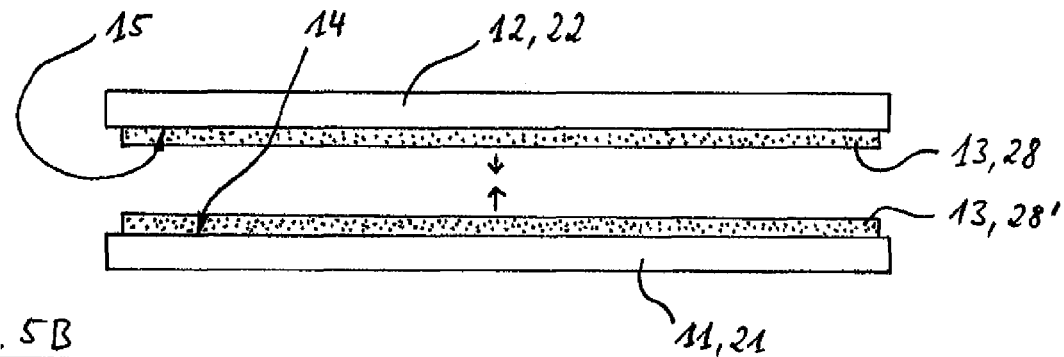
FIG. 5B is a sectional view of a first and a second assembly component or a first and a second layer of a material which can be deformed by creep forming being coated with a thermoplastic plastics material.

FIG. 2A shows an arrangement 10 which is formed by arranging a second assembly component 12 on a first assembly component 11. A sheet 28 of a thermoplastic plastics material 13 is provided between the two assembly components 11 and 12. In FIG. 2A, the sheet 28 of the thermoplastic plastics material 13 is not yet connected to the two assembly components 11 and 12, but can, as shown in FIG. 4, be laid between the first assembly component 11 and the second assembly component 12 in the form of a film or foil so as to form the arrangement 10. Alternatively, the thermoplastic plastics material 13 may also be applied as a coating to one of the assembly components 11, 12, for example to a lower surface 15 of the second assembly component 12, as shown in FIG. 5, or to an upper surface 14 of the first assembly component 11, as shown in FIG. 5A, for example by thermal spraying. The thermoplastic plastics material 13 can also be applied to the mutually facing surfaces 14 and 15 of the two assembly components 11, 12 as a coating, as is sketched in FIG. 5B. The arrows in FIGS. 4, 5, 5A and 5B show how the first and second assembly components 11, 12 are placed on one another to form the arrangement 10.

To make the thermoplastic plastics material 13 adhere well to the upper surface 14 of the first assembly component 11 and to the lower surface 15 of the second assembly component 12, the surfaces 14 and 15 are pre-treated either before the film is laid between the assembly components 11, 12 or before one or both assembly components 11, 12 are coated with the thermoplastic plastics material 13, depending on which variant is selected. In this embodiment, the pre-treatment comprises cleaning and degreasing the two surfaces 14 and 15 and subsequently anodising (also known as eloxadising) the two surfaces 14, 15. Subsequently, a basecoat (known as a primer) is preferably additionally applied to the surfaces 14 and 15. Whilst anodising is preferred, it is also conceivable to provide the surfaces 14 and 15 each with a conversion coating or with a sol gel sheet before the base coating instead.

After the arrangement 10 is formed, it is applied to a mould 16, so as mechanically to deform the arrangement 10 by applying a force F and/or a pressure P to the arrangement 10. A surface 17 of the mould 16 comprises a surface geometry which substantially corresponds to a desired target geometry of the structural assembly 6 to be manufactured when finished. As is shown in FIG. 2C, the arrangement 10 is initially pressed against the surface 17 by the force F and/or the pressure P, and thus deformed. The force F and/or the pressure P which acts in a planar manner can be applied in a manner known per se, by means of a vacuum bag, by means of a movable counter piece for the mould 16, or in some similar manner. So as to achieve lasting creep forming of the material of the first and second assembly components 11, 12, the arrangement 10 is heated to temperatures preferably in the range between 275° C. and 375° C., for example 325° C., by supplying heat W, and this temperature is maintained for a pre-determined period, preferably ten minutes or longer, for example approximately two hours. Deformation of this type by means of a mould 16, under the simultaneous action of mechanical force F or pressure P acting in a planar manner and heat W, is also known as creep forming. Subsequently, the arrangement 10 cools again, and can be removed as a finished structural assembly 6 after the forces F and the pressure P have been removed.

In the embodiment shown, the first assembly component 11 and the second assembly component 12 are produced from an aluminium magnesium scandium alloy, also known as AlMgSc alloy for short. Alloying scandium contributes advantageously to the possibility of exposing the assembly components 11 and 12 to temperatures for example in the range of 300° C. to 350° C., depending on the composition of the alloy, without the alloy from which the assembly components 11 and 12 are produced losing the favourable mechanical properties thereof. This is advantageous because, during heating to temperatures in the range of 275° C. to 375° C., the mechanical tensions induced in the assembly components 11 and 12 by the action of the mechanical forces F and/or the pressure P are relaxed. This relaxation means that when the forces F and/or the pressure P are removed, no resilience or "spring-back" of the arrangement 10 occurs. The first and second assembly components 11, 12 are thus brought into the desired target geometry of the structural assembly 6 by the creep forming; the surface 17 of the mould 16 can be formed with this target geometry without having to take "spring-back" into account. Expensive analyses or simulations to determine the surface geometry of the mould 16 can thus be dispensed with.

In the stated temperature range, the thermoplastic plastics material 13, which extends as a sheet between the assembly components 11 and 12, can melt in part or even completely if desired. The melted portion of the thermoplastic plastics material 13 can come to lie against the surfaces 14 and 15 of the assembly components 11, 12. As a result of cooling, the thermoplastic plastics material 13 solidifies again and thus rigidly and permanently interconnects the first assembly component 11 and the second assembly component 12 by adhesion, resulting in them forming the structural assembly 6. The aforementioned pre-treatment of the surfaces 14, 15 improves the adhesion of the thermoplastic plastics material to these surfaces and thus the connection of the assembly components 11, 12.

In this way, a permanent and reliable connection, and simultaneously deformation of the assembly components 11 and 12 into the desired final shape thereof, are achieved in one and the same operation. After the cooling, the finished structural assembly 6 can be removed from the mould 16. Separate deformation of the first and second assembly components 11, 12 and subsequent fastening thereof to one another in a further, separate operation is dispensed with.

To improve the mechanical properties of the finished structural assembly 6, reinforcing fibres (not shown in the drawings) can be embedded in the thermoplastic plastics material 13. Glass fibres, carbon fibres, Zylon fibres or combinations thereof may for example be selected as fibres. The reinforcing fibres may also be arranged in a plurality of layers of parallel fibres extending in different directions, and in particular already be embedded in the thermoplastic plastics material 13 before the creep forming, for example in the film laid between the assembly components 11, 12 according to FIG. 4 or in the coating according to one of FIGS. 5, 5A and 5B.

FIGS. 2A to 2C also illustrate the manufacture of a semi-finished product 7, which can be used for manufacturing a structural assembly for air or space travel by creep forming the semi-finished product 7. The first and second assembly components 11 and 12 form a first layer 21 and a second layer 22 of a stack 20. The layers 21, 22 are both manufactured as foils or thin sheets of an AlMgSc alloy; the thickness of the layers may for example be 0.2 mm to 6.0 mm, preferably 0.8 mm to 3.8 mm, more preferably 0.8 mm to 2.0 mm. Between the layers 21, 22 which are laid on top of one another, the thermoplastic plastics material 13 is arranged in the form of a sheet 28, either as a film which is laid in between or as a coating of one of the layers 21, 22, as explained with reference to FIGS. 5, 5A and 5B. By introducing heat W, the stack 20 is heated, resulting in the thermoplastic plastics material 13 melting in part or completely and connecting the two layers 21 and 22. In this context, as shown in FIG. 2C, the layers 21, 22 may already be being brought into a curved shape by creep forming. Alternatively, the surface 17 for manufacturing the semi-finished product 7 may also be planar, in which case a planar semi-finished product 7 is manufactured, which in a further processing step can also be heated and subjected to creep forming again until the thermoplastic plastics material softens or melts. When producing the semi-finished product 7 too, reinforcing fibres can be embedded in the thermoplastic plastics material 13, as disclosed for the structural assembly 6 of FIG. 2C. The reinforcing fibres may extend substantially parallel in one direction, or in a manner known per se a plurality of sheets of reinforcing fibres may be provided, in which the fibres extend in different directions, extending mutually offset by predetermined angles. This makes it possible to produce a semi-finished product 7 in the form of a fibre metal laminate (FML). In the semi-finished product 7 too, the surfaces 14 and 15 of the layers 21, 22 are pre-treated before forming the stack 20 in the same way as was described above for the structural assembly 6 of the first embodiment.

Figure 3A:
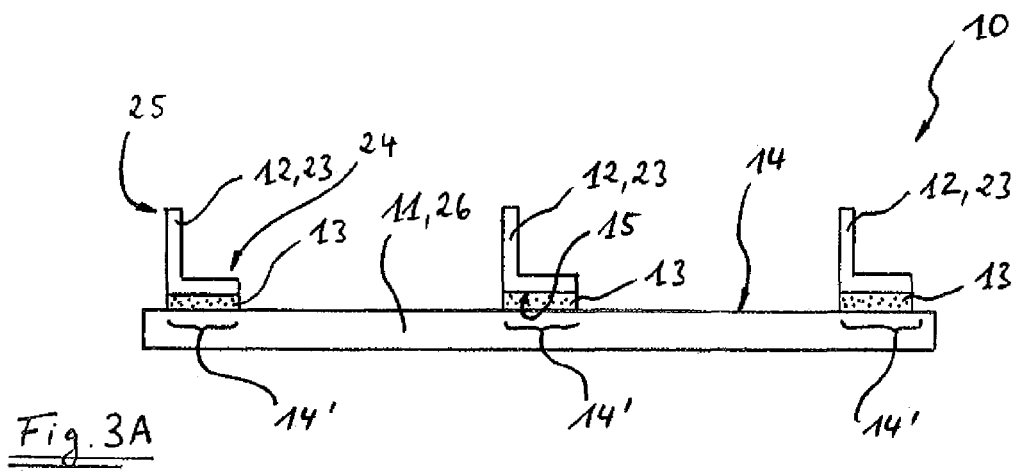
FIGS. 3A-C are sectional views of the manufacture of a structural assembly in accordance with a second embodiment of the invention.
Figure 3B:
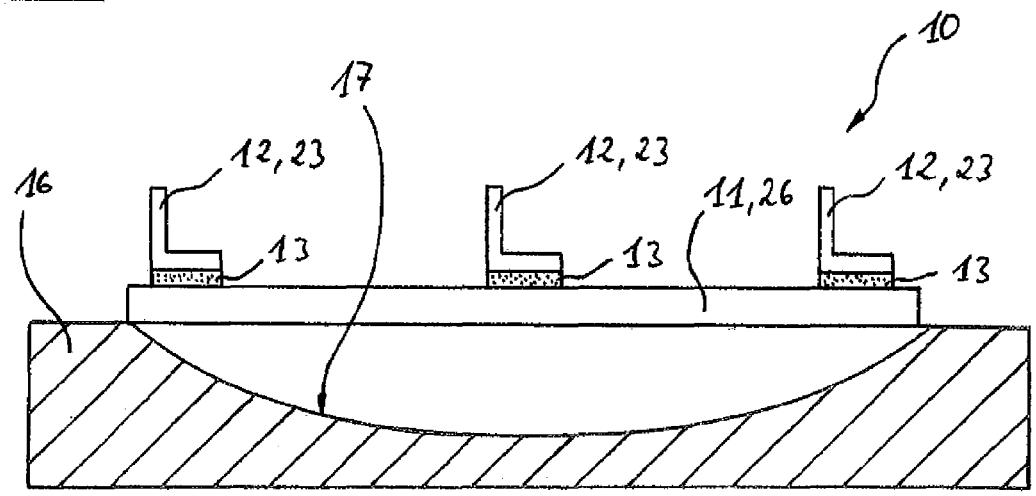
Figure 3C:
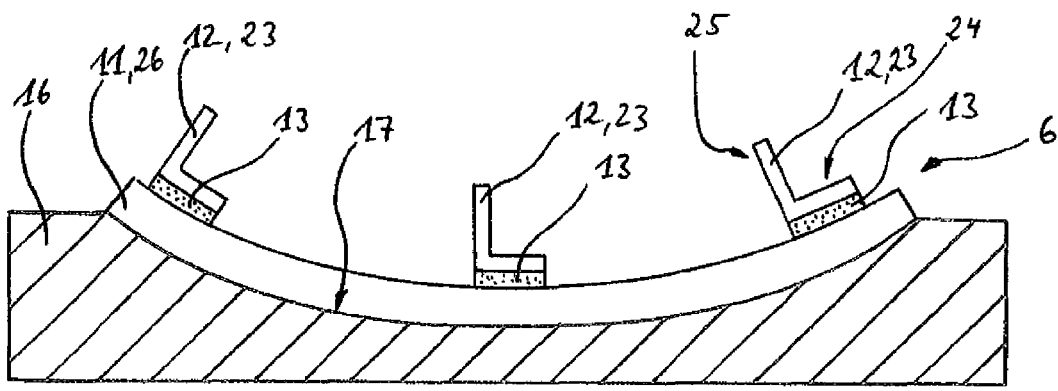

FIGS. 3A to 3C show the manufacture of a structural assembly 6 in accordance with a second embodiment of the invention, in the form of a fuselage shell 4. While a first assembly component 11 is provided, and is in the form of a thin-walled shell skin 26 for the fuselage shell 4, a plurality of reinforcing members are provided as second assembly components 12, and are in the form of stringers 23 for reinforcing the shell skin 26 and in the example shown extend substantially parallel to the plane of the drawing. The first and second assembly components 11 and 12 in turn form an arrangement 10. The stringers 23 of FIGS. 3A to 3C have an L profile comprising a first limb 24 serving as a stringer foot and a second limb 25, in this example extending substantially perpendicular to the first limb 24, it also being possible to use stringers 23 having a different profile, for example a Z profile or an omega profile. In turn, a sheet of a thermoplastic plastics material 13 is provided between the stringers 33 and the upper surface 14 of the shell skin 26 in each case.

Figure 6:
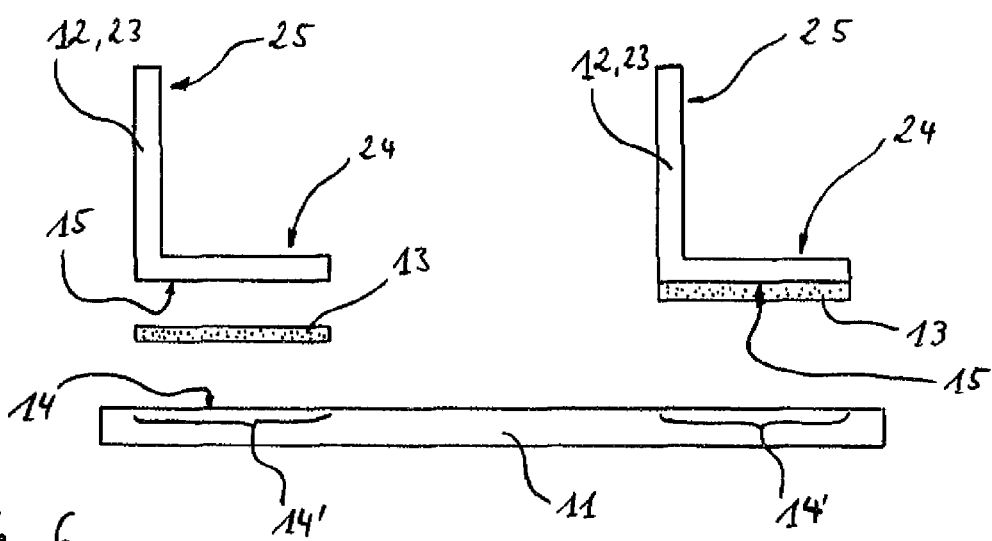
FIG. 6 is a sectional view of a film or a foil of a thermoplastic plastics material being laid between a reinforcing member and a shell skin for a structural assembly and of a surface of another reinforcing member for the shell skin being coated with a thermoplastic plastics material.
Figure 6A:
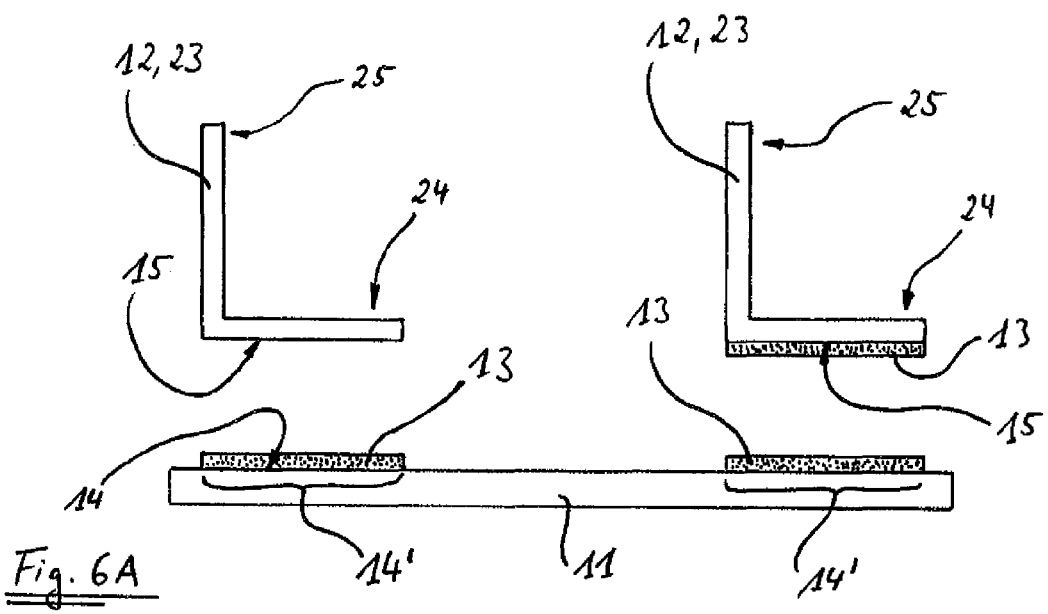
FIG. 6A shows a surface portion of a shell skin being coated with a thermoplastic plastics material, in accordance with a variant, and a surface of a reinforcing member and another surface portion of the shell skin being coated with a thermoplastic plastics material, in accordance with another variant.

FIG. 6 shows two options for preparing the thermoplastic plastics material 13 for manufacturing the structural assembly 6 in accordance with the second embodiment, either as a film or foil, which is laid between the first limb 24 and the shell skin 26, or as a coating of a lower surface 15 of the first limb 24 of the stringer 23, for example by thermally spraying the thermoplastic plastics material 13 onto the lower surface 15 of the stringer foot. As is sketched in FIG. 6A, in addition or as an alternative to the lower surface 15 of the first limb 24 of the stringer 23, a surface portion 14' of the upper surface 14 of the shell skin 26 may also be coated with the thermoplastic plastics material 13. So as to ensure good adhesion of the thermoplastic plastics material 13 to the first and second assembly components 11 and 12 in this case too, in FIGS. 6 and 6A to the shell skin 26 and the stringer 23, the upper surface 14 or at least the surface portions 14' of the upper surface 14 of the shell skin 26 and the lower surface 15 of the stringer 23 are pre-treated in the same way as was disclosed above with reference to FIGS. 4, 5, 5A and 5B.

In the manufacture shown in FIGS. 3A to 3C of a structural assembly 6 which is reinforced by stringers 23, the second assembly components 12 in the form of stringers 23 extend substantially transverse to the direction in which the structural assembly 6 will primarily be curved when finished, and are therefore not deformed or virtually not deformed themselves. However, as is shown in FIG. 3C, when the shell skin 26 is subjected to creep forming they are reliably connected thereto by melting and resolidifying the thermoplastic plastics material 13. In the second embodiment of FIGS. 3A to 3C too, reinforcing fibres such as glass fibres, carbon fibres or Zylon fibres may be embedded in the thermoplastic plastics material 13. The stringers 23 and the shell skin 26 of the second embodiment are preferably produced from an AlMgSc alloy. For the first assembly component 11 which forms the shell skin 26, a metal sheet which is planar before the creep forming and has a thickness in the range of 0.8 mm to 6.0 mm, preferably 0.8 mm to 3.8 mm and more preferably 0.8 mm to 2.0 mm may in particular be considered.

Figure 7A:
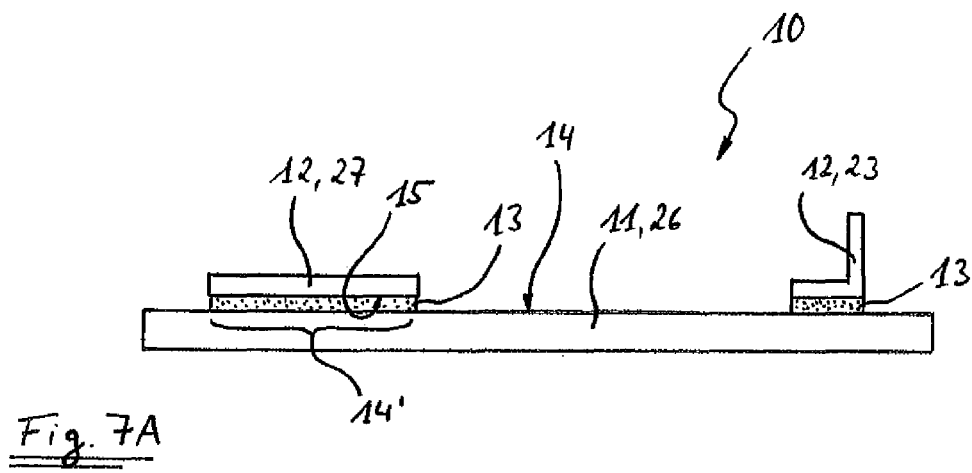
FIGS. 7A-C are sectional views of the manufacture of a structural assembly in accordance with a third embodiment of the invention.
Figure 7B:
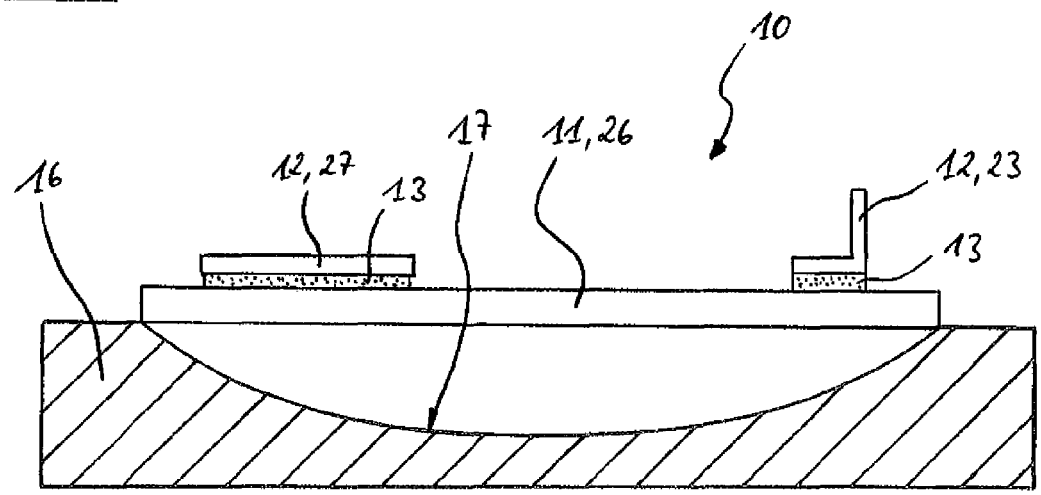
Figure 7C:
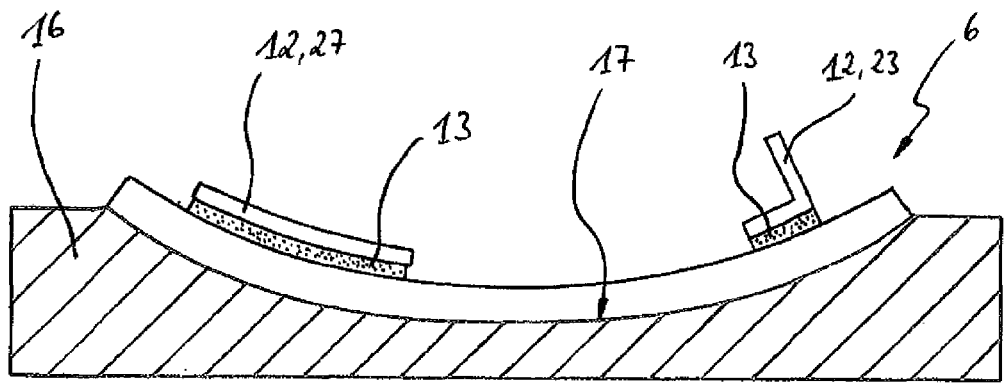

FIGS. 7A to 7C show a third embodiment of the invention. An arrangement 10 of a first assembly component 11, which is in turn in the form of a shell skin 26 for a structural assembly 6, is shown. As in FIG. 3A, the arrangement 10 comprises a second assembly component 12 in the form of a stringer 23. In the third embodiment of the invention, a further second assembly component 12 is in the form of a doubler 27 for locally reinforcing the shell skin 26. In turn, between the doubler 27 and the shell skin 26 and between the stringer 23 and the shell skin 26, in each case a sheet of a thermoplastic plastics material 13 is arranged. In FIG. 7A, the doubler 27 and the stringer 23 are initially laid loosely on the shell skin 26. They may be fixed temporarily, for the subsequent creep forming and connection by melting the thermoplastic plastics material 13, using suitable means such as pins and the like (not shown here for clarity). These means are removed again after the finished structural assembly 6 has cooled and the thermoplastic material 13 has solidified.

As is shown in FIGS. 7B and 7C, the arrangement 10 of the third embodiment is subjected to creep forming by heating as in the first embodiment. By melting the thermoplastic plastics material 13 in part and subsequently solidifying it, the stringer 23 and the doubler 27 are connected to the shell skin 26, resulting in the structural assembly 6 being formed. During the creep forming, in the third embodiment too a temperature of between 275° C. and 375° C. is achieved and maintained for a period of more than ten minutes, for example two hours. The doubler 27 and the stringer 23 of FIGS. 7A-C are preferably also made of an AlMgSc alloy.

Figure 8A:
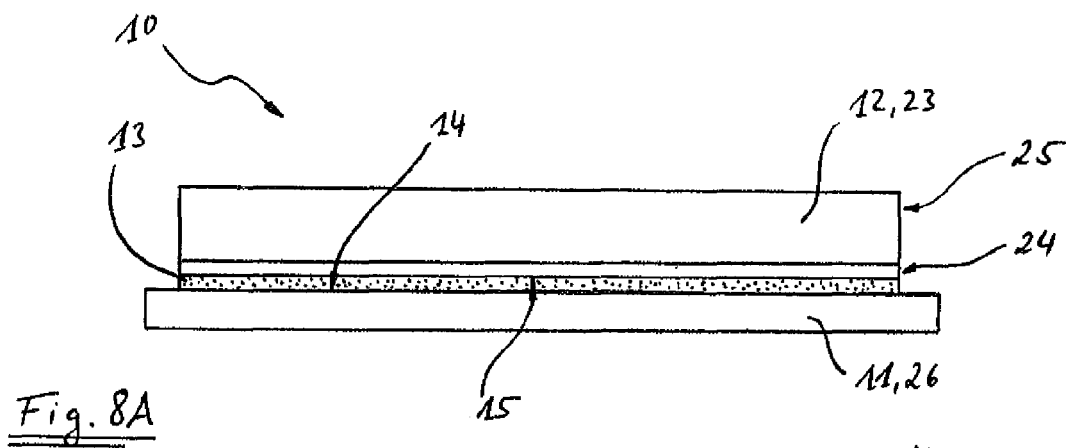
FIGS. 8A-C are sectional views of a structural assembly in accordance with a fourth embodiment of the invention.
Figure 8B:
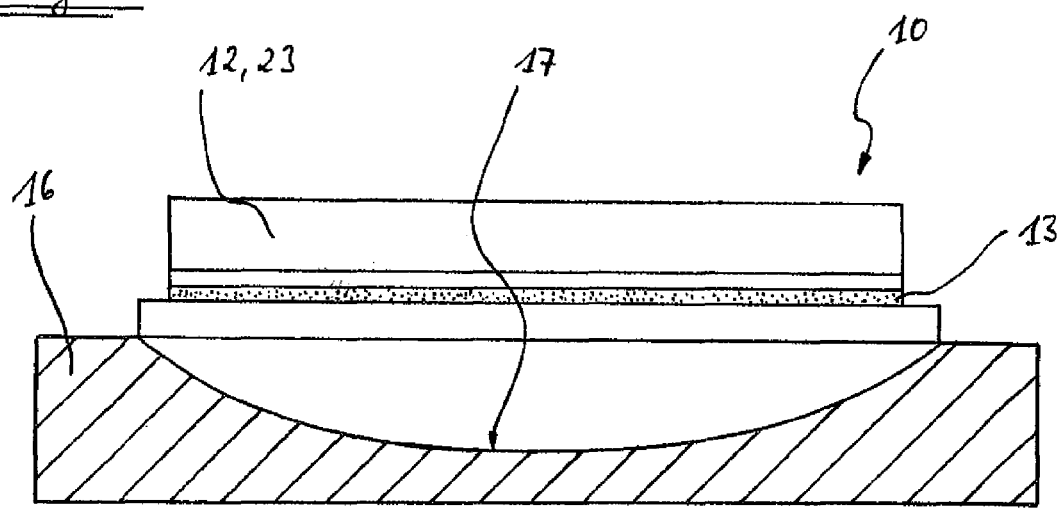
Figure 8C:
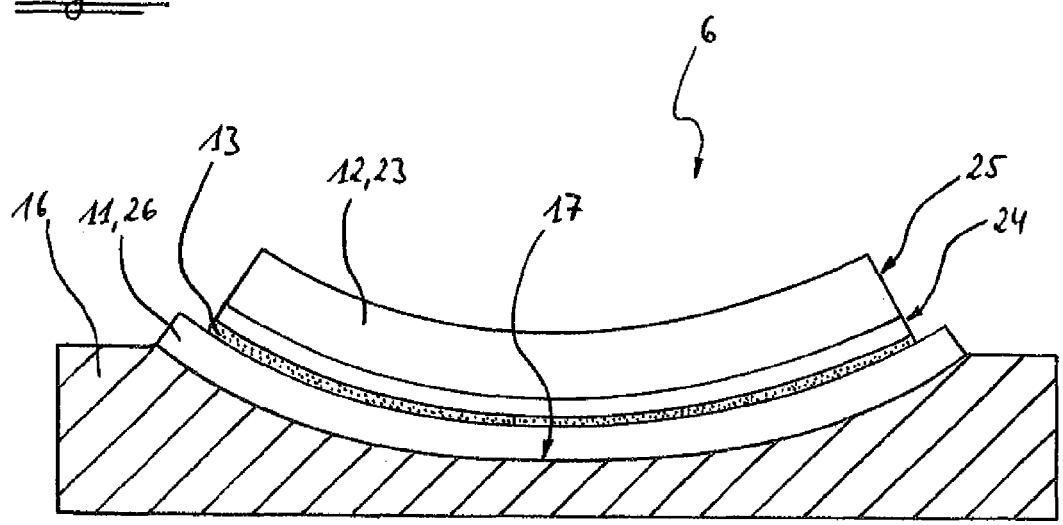

In a fourth embodiment of the invention in accordance with FIGS. 8A to 8C, a stringer 23 is shown in the form of a reinforcing member for a shell skin 26, which now extends substantially along the desired primary direction of curvature of the shell skin 26. In this example, the stringer 23 is again provided with an L cross-section having a first limb 24 and a second limb 25. During the creep forming, the stringer 23 is also deformed and simultaneously connected to the shell skin 26 by a sheet of a thermoplastic plastics material 13, as described in relation to the previous embodiments. Preferably, in this context the stringer 23 and the shell skin 26 are in turn produced from an AlMgSc alloy. In this case it may be expedient to select the same AlMgSc alloy for the stringer 23 and the shell skin 26; however, it is also possible to provide different alloys from this family of alloys for these assembly components.

In accordance with a fifth embodiment of the invention, as illustrated in

Figure 9A:
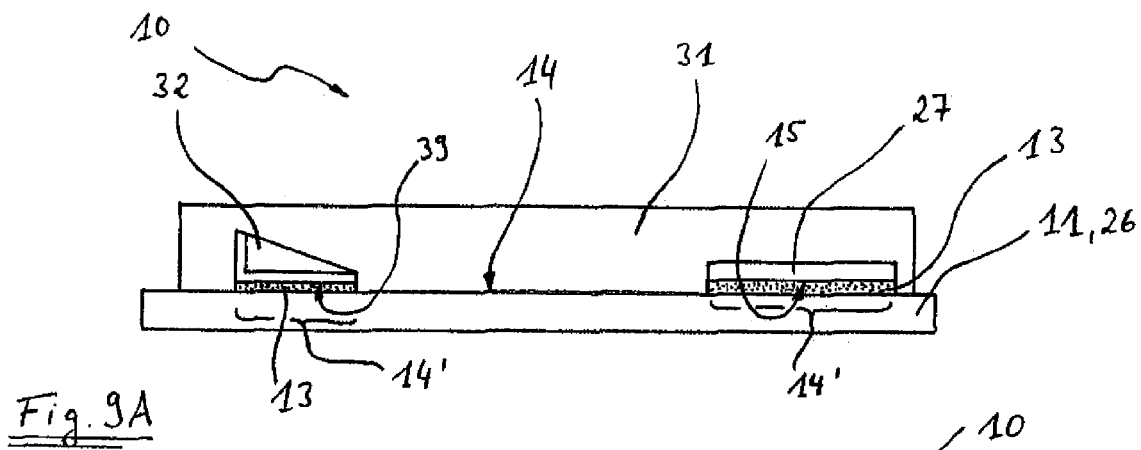
FIGS. 9A-C are sectional views of a structural assembly in accordance with a fifth embodiment of the invention.
Figure 9B:
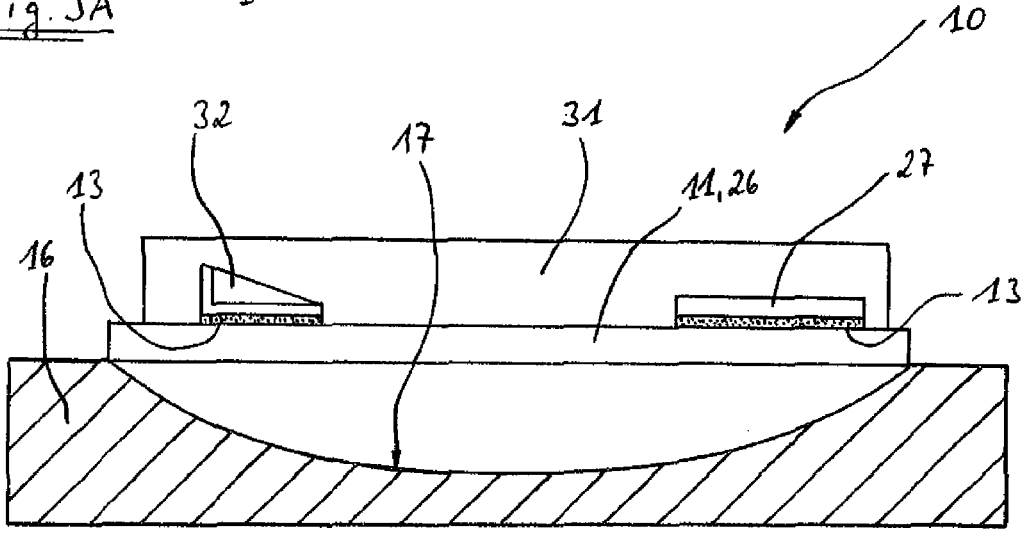
Figure 9C:
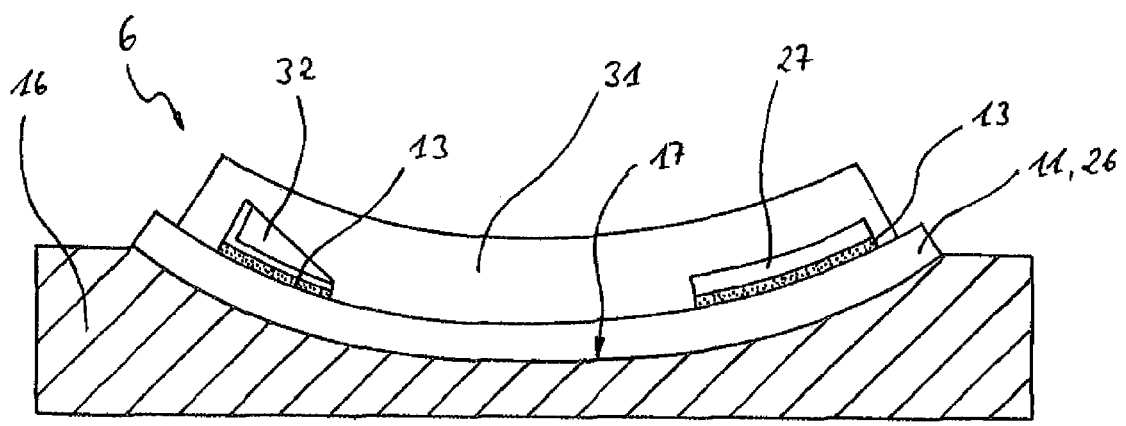

FIGS. 9A to 9C, before forming an arrangement 10, initially one or more third assembly components 31 may be connected to a first assembly component 11, other than by means of a thermoplastic plastics material. The first assembly component 11 of FIG. 9A is in the form of a substantially planar sheet of an AlMgSc alloy, the thickness of the sheet being for example between 0.8 mm and 6.0 mm, preferably 0.8 mm to 3.8 mm, more preferably 0.8 mm to 2.0 mm. In the finished structural assembly 6, the first assembly component 11 forms a shell skin 26. FIG. 9A only shows a third assembly component 31, which in this example is in the form of a stringer, the longitudinal direction of which extends substantially parallel to the plane of the drawing. The stringer serves to reinforce the shell skin 26 in the structural assembly 6, and is already welded to the first assembly component 11 in FIG. 9A. The welding may for example take place by a laser beam welding method. Preferably, the third assembly component 31 is also produced from an AlMgSc alloy. In addition to the first and third assembly components 11, 13 which are already connected, the arrangement 10 according to the embodiment of FIGS. 9A-C further comprises two second assembly components 12, of which one is in the form of a local reinforcing member 32, sketched by way of example in FIG. 9A, and the other is in the form of a doubler 27 for locally reinforcing the shell skin 26. In this example too, a sheet of a thermoplastic plastics material 13 is arranged between a lower surface 15 of the doubler 27 and an upper surface 14 of the first assembly component 11 as well as between the local reinforcing member 32 and the upper surface 14 of the first assembly component 11. In FIG. 9B, the arrangement 10 of FIG. 9A is placed on a mould and subjected to creep forming under the action of pressure and heat. In this context, the first and third assembly components 11 and 31, in other words the shell skin 26 and the stringer welded thereto, are deformed. At the same time, at the end of the creep forming the local reinforcement member 32 and the doubler 27 are rigidly connected to the shell skin 26. After the cooling, the structural assembly 6 can be removed from the mould 16 as a finished component. The local reinforcing member 32 may also be in the form of a frame for a window of an aircraft and may also be deformed during the creep forming. Instead of the local reinforcing member 32, a fastening member, for example a titanium or steel clamp not shown here, could also be connected to the shell skin 26 by means of the thermoplastic plastics material 13.

Figure 10A:
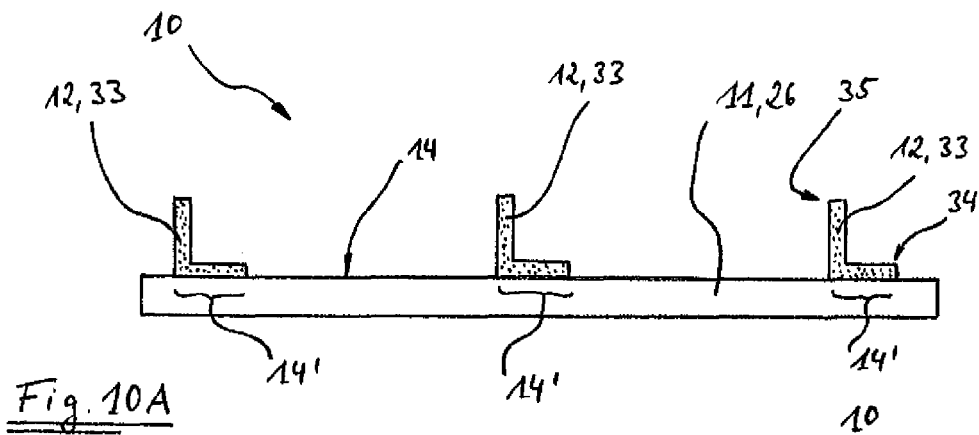
FIGS. 10A-C are sectional views of a structural assembly in accordance with a sixth embodiment of the invention.
Figure 10B:
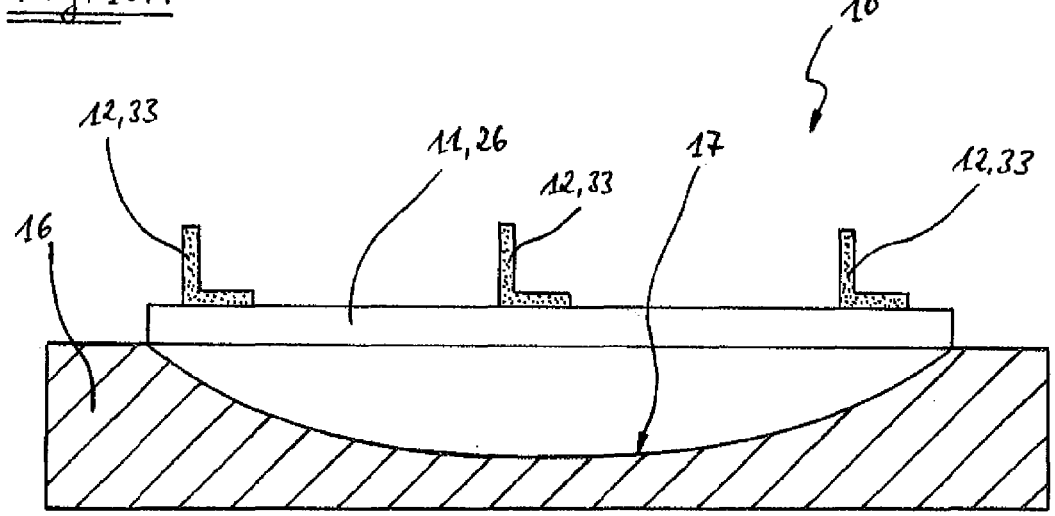
Figure 10C:
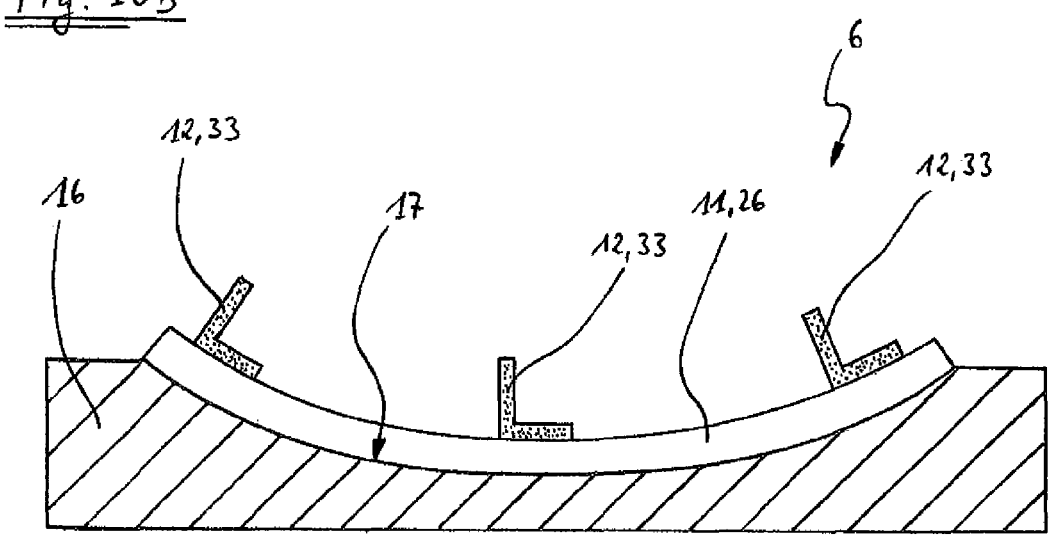

In accordance with a sixth embodiment of the invention, which is shown in FIGS. 10A to 10C, the second assembly component 12 is formed as a composite component comprising a matrix of a thermoplastic plastics material. Preferably, reinforcing fibres are embedded in the matrix of the second assembly component 12, which in FIGS. 10A to 10C is shown as a stringer 33 for reinforcing a shell skin 26. For this purpose, in particular glass fibres, carbon fibres or Zylon fibres or a combination thereof may be selected. Preferably, the stringers 33 are already produced as composite components before being arranged on the first assembly component 11 by embedding the fibres in the thermoplastic matrix. As is illustrated in FIGS. 10B and 10C, the stringers 33, together with the first assembly component 11 which in this case is in turn in the form of a comparatively thin sheet of an AlMgSc alloy, for example having a thickness in a range of 0.8 mm to 3.8 mm and intended to form a shell skin 26, form an arrangement 10. In this example too, the stringers 33 are provided with an L-shaped cross-section, a first limb 34 coming to lie on the first assembly component 11 when the arrangement 10 is formed and a second limb 35 projecting from the first assembly component 11. As in the previous embodiments, the arrangement 10 is subjected to creep forming. In this context, the first assembly component 11 is deformed. The temperature during the creep forming is selected in such a way that the thermoplastic matrix of the stringers 33 melts at least in part for connection to the first assembly component 11. Advantageously, complete melting of the stringers 33 is prevented by a suitable selection of the temperature and of the progression thereof over time. So as to ensure that the stringers 33 substantially maintain the cross-sectional shape thereof during the creep deformation, but are still reliably connected to the shell skin 26, devices which are not shown in FIGS. 10A to 10C may be provided. Preferably, in this embodiment too, surface portions 14' of the upper surface 14 of the shell skin 26 are pre-treated in the manner disclosed above, so as to improve the adhesion of the thermoplastic plastics material to the shell skin 26.

Figure 11A:
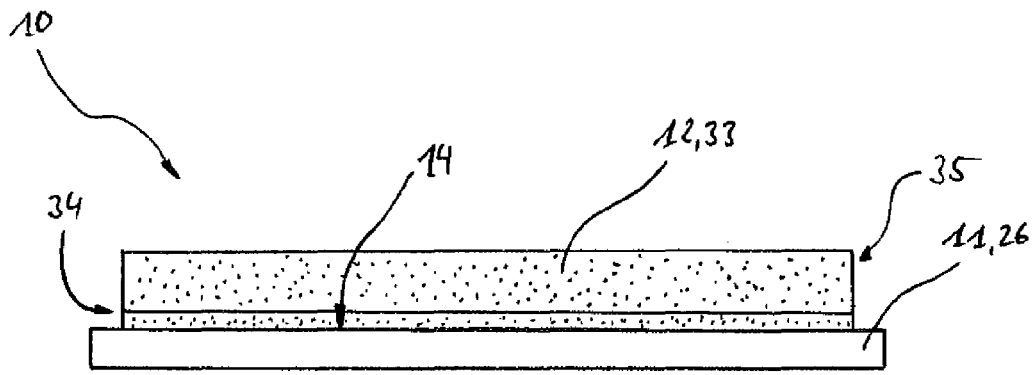
FIGS. 11A-C are sectional views of a structural assembly in accordance with a seventh embodiment of the invention.
Figure 11B:
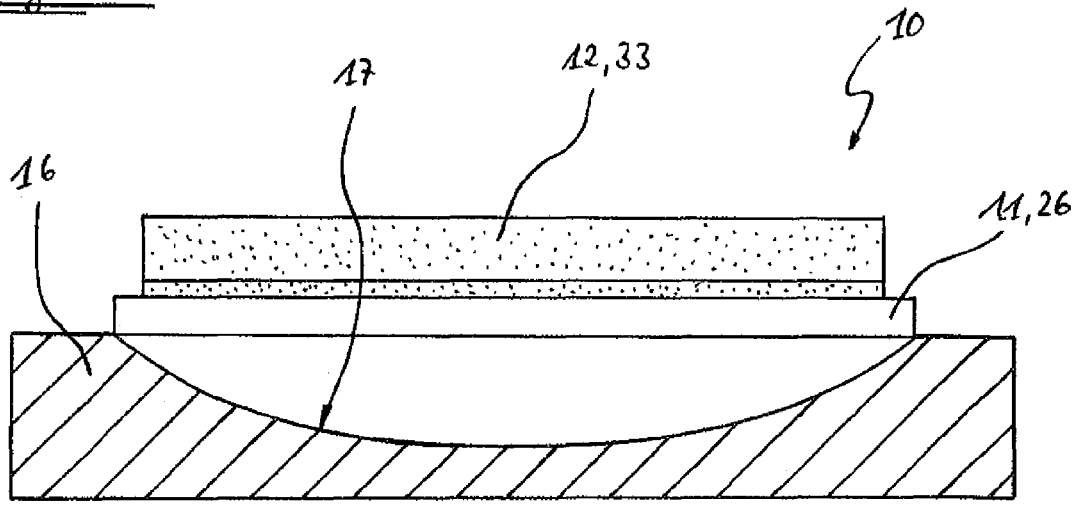
Figure 11C:
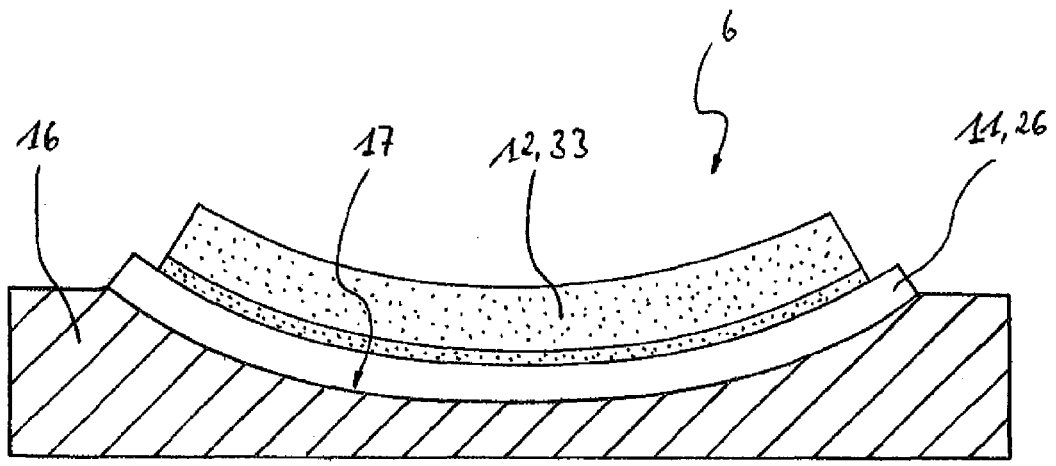

The seventh embodiment of the invention, as sketched in FIGS. 11A to 11B, merely differs from the sixth embodiment of FIGS. 10A-C by way of the orientation of the longitudinal direction of the stringers 33, only one of which is visible in FIGS. 11A to 11C. In the seventh embodiment, the stringer 33 is also deformed along the primary direction of curvature of the shell skin 26 during the creep forming and simultaneously connected to the shell skin 26.

Figure 12A:
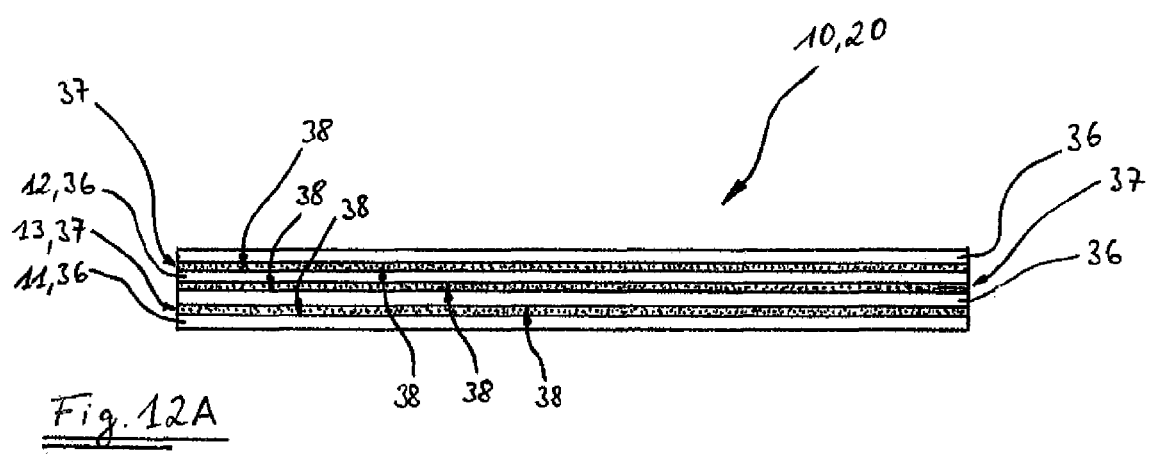
FIGS. 12A-C are sectional views of the manufacture of a structural assembly or a semi-finished product in accordance with an eighth embodiment of the invention.
Figure 12B:
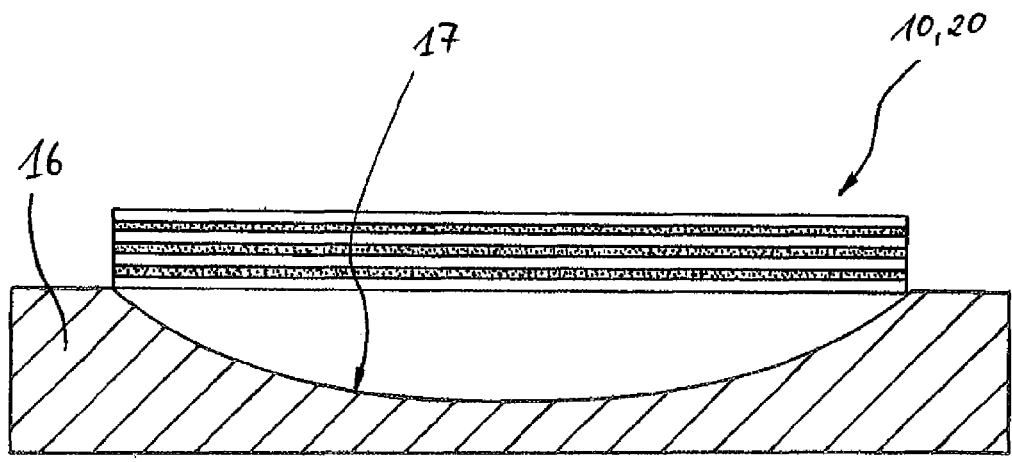
Figure 12C:
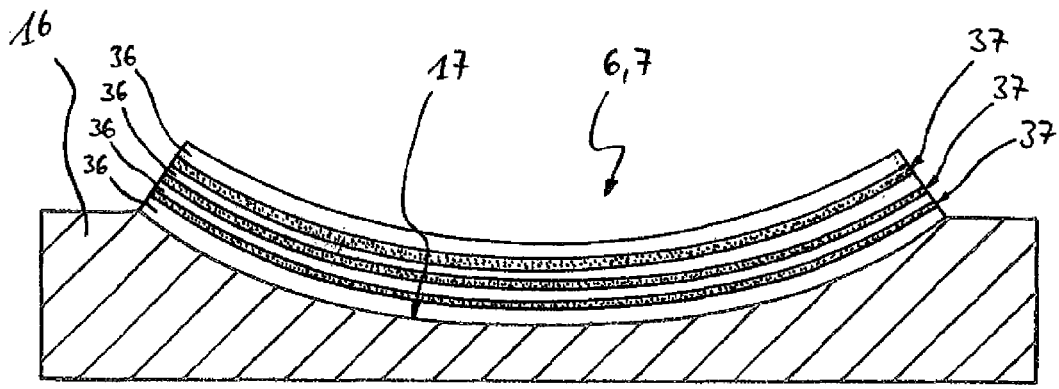

In accordance with the eighth embodiment of the invention, a structural assembly 6 or a semi-finished product 7 is manufactured as a fibre metal laminate (FML) comprising a plurality of layers 36 of a material which can be deformed by creep forming and a plurality of sheets 37, each arranged between two layers 36, of a thermoplastic plastics material 13, as illustrated in FIGS. 12A to 12C. The layers 36 are preferably in the form of foils or thin sheets of an AlMgSc alloy, and preferably have thicknesses in the range of 0.2 mm to 6.0 mm, preferably in the range of 0.2 mm to 1.0 mm. The layers 36 and sheets 37 are arranged on top of one another, and form an arrangement 10 which may also be referred to as a stack 20. In this embodiment, one of the layers 36 may be considered as a first assembly component 11, an adjacent layer 36 as a second assembly component 12, and the other layers 36 as further assembly components. To form a structural assembly 6 or a semi-finished product 7, the arrangement 10 or the stack 20 is laid in a mould 16 and subjected to creep forming using force and/or pressure, as well as heat. The temperature during the creep forming is selected in such a way that the individual layers 36 are interconnected by melting the thermoplastic plastics material 13 in the layers 37 at least in part, and is preferably between 275° C. and 375° C. In the eighth embodiment too, the previously disclosed surface pre-treatment in relation to the surfaces of the layers 36 may be found to be expedient. Further, the surface 17 shown in FIGS. 12B and 12C of the mould 16 may also be planar, making it possible to produce a planar semi-finished product 7 comprising connected layers 36 without any deformation. This may also be deformed in a further step in the manner disclosed above, again by creep forming. Reinforcing fibres may likewise be embedded in the thermoplastic plastics material 13 of some or all of the sheets 37, as described in relation to FIGS. 2A-C.

Figure 13A:
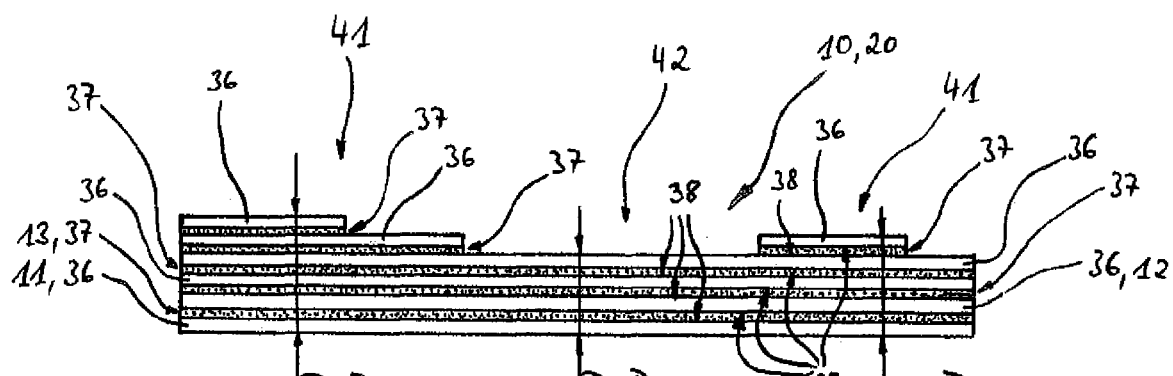
FIGS. 13A-C are sectional views of the manufacture of a structural assembly or a semi-finished product in accordance with a ninth embodiment of the invention.
Figure 13B:
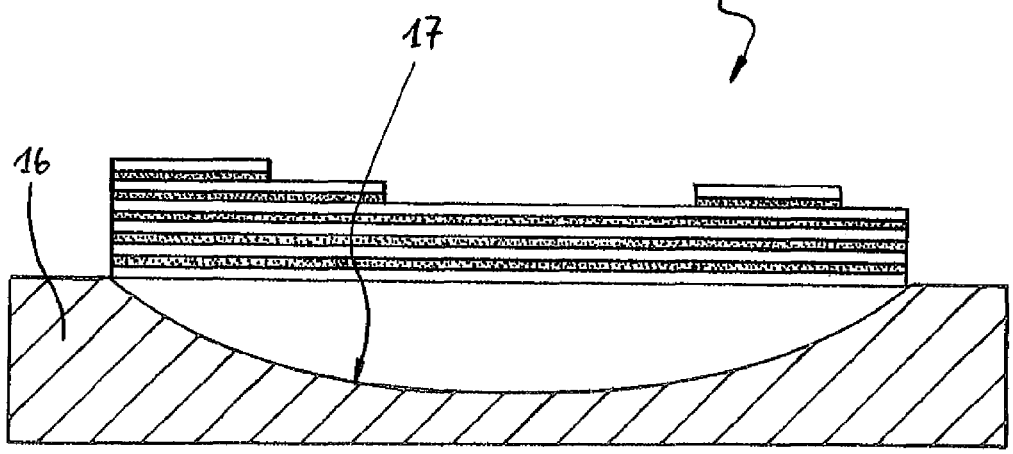
Figure 13C:
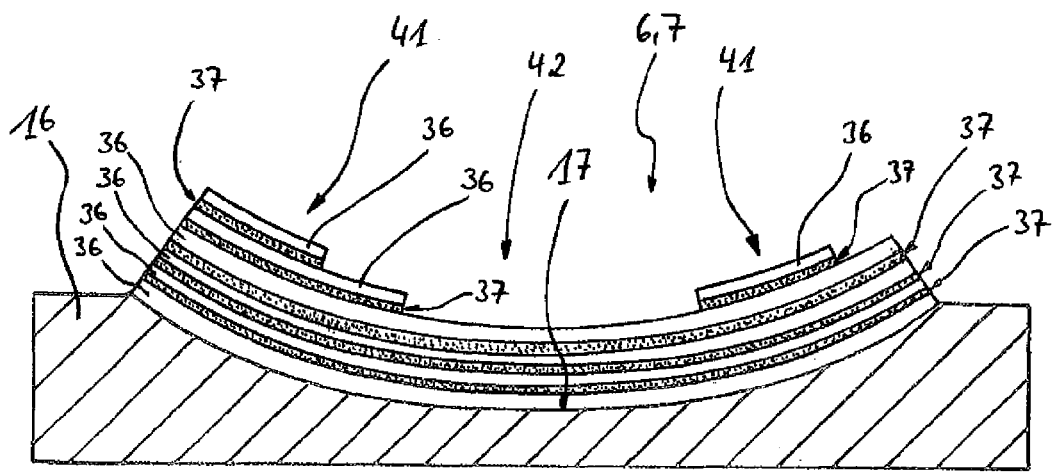

As is shown in the ninth embodiment of FIGS. 13A to 13C, a structural assembly 6 or semi-finished product 7 of this type may also be manufactured in such a way that it has a different thickness D in different regions 41, 42. Beyond this, there is no difference between the eighth embodiment and the ninth embodiment. This can be achieved in that more layers 36 are provided in some regions 41 and fewer in other regions 42, and accordingly more or fewer sheets 37 of the thermoplastic plastics material 13 are provided.

Figure 14A:
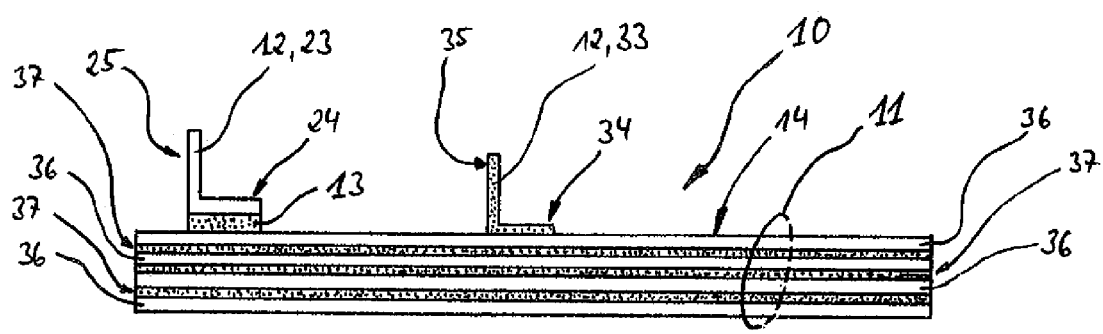
FIGS. 14A-C are sectional views of a structural assembly in accordance with a tenth embodiment of the invention.
Figure 14B:
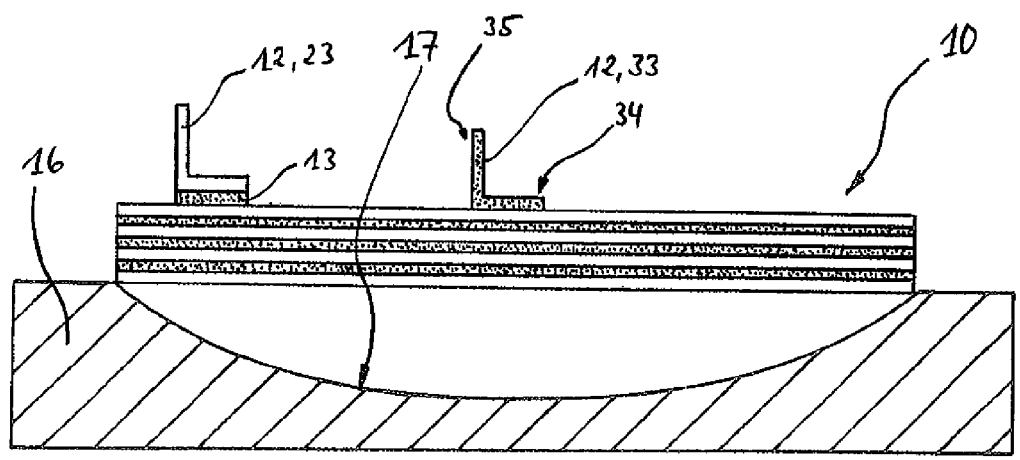
Figure 14C:
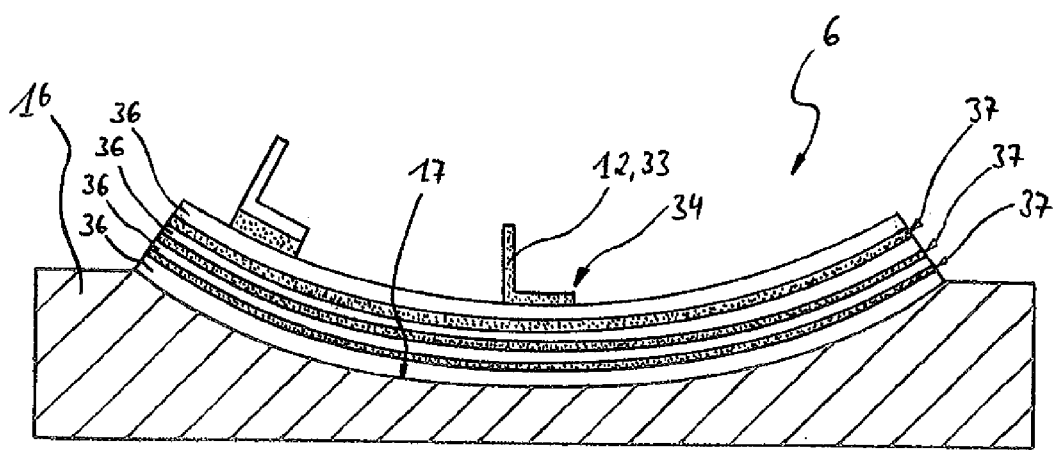

In the tenth embodiment in accordance with FIGS. 14A to 14C, a first assembly component 11, manufactured from a semi-finished product 7 as disclosed above in relation to FIGS. 12A to 12C or 13A to 13C, is provided for forming a structural assembly 6. For example, the first assembly component 11 of FIG. 14A may be tailored from a first semi-finished product 7, comprising a plurality of layers 36 of a material which can be subjected to creep forming, such as an AlMgSc alloy, and layers 37 of a thermoplastic plastics material 13. Together with further, second assembly components 12, the first assembly component 11 in FIG. 14A forms an arrangement 10. By way of example, FIG. 14A shows a stringer 23 made of an AlMgSc alloy and a stringer 33 in the form of a composite component. As in FIG. 3A a sheet of a thermoplastic plastics material 13 is arranged between the stringer 23 and the first assembly component 11. The matrix of the stringer 33 is likewise formed from a thermoplastic plastics material, which may also be of a different composition from the thermoplastic plastics material 13 between the stringer 23 and the first assembly component 11. The thermoplastic plastics material in the sheets 37 of the semi-finished product may also differ from the thermoplastic plastics materials in the matrix of the stringer 33 and between the stringer 23 and the first assembly component 11. To manufacture the structural assembly 6, the arrangement 10 is subjected to creep forming under the action of pressure and heat, the thermoplastic plastics material 13, the matrix of the stringer 33 and the sheets 37 melting in part and making it possible to connect all of the components to form the structural assembly 6, for example a fuselage shell 4, upon cooling and solidifying. In this tenth embodiment, the layers 36 of the semi-finished product from which the first assembly component 11 is manufactured may already be connected by means of the layers 37. However, the layers 36 may also be positioned on top of one another loose and unconnected as shown in FIG. 14A, it being possible for the thermoplastic plastics material for the sheets 37 to be provided as disclosed in relation to FIGS. 4 and 5.

Figure 15A:
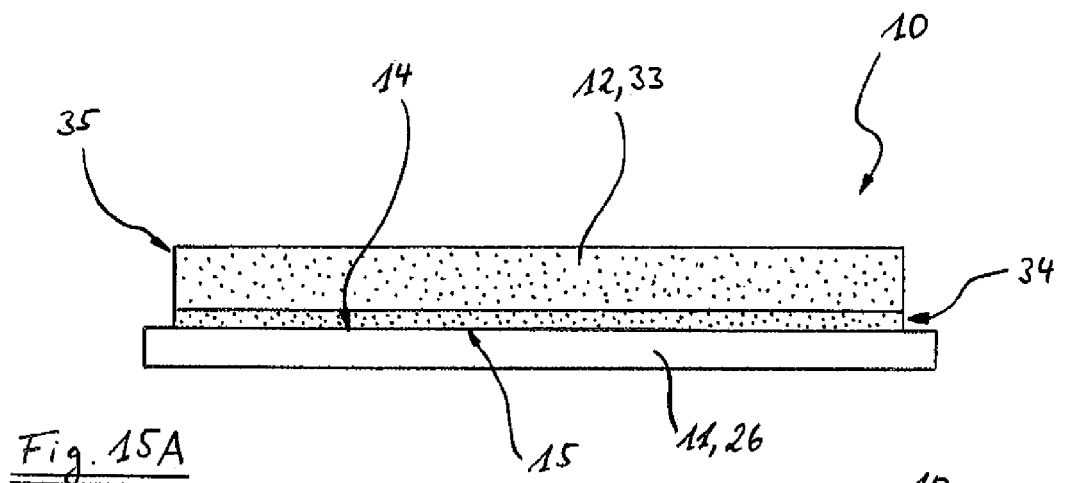
FIGS. 15A-C are sectional views of a method for manufacturing a structural assembly in accordance with an eleventh embodiment of the invention.
Figure 15B:
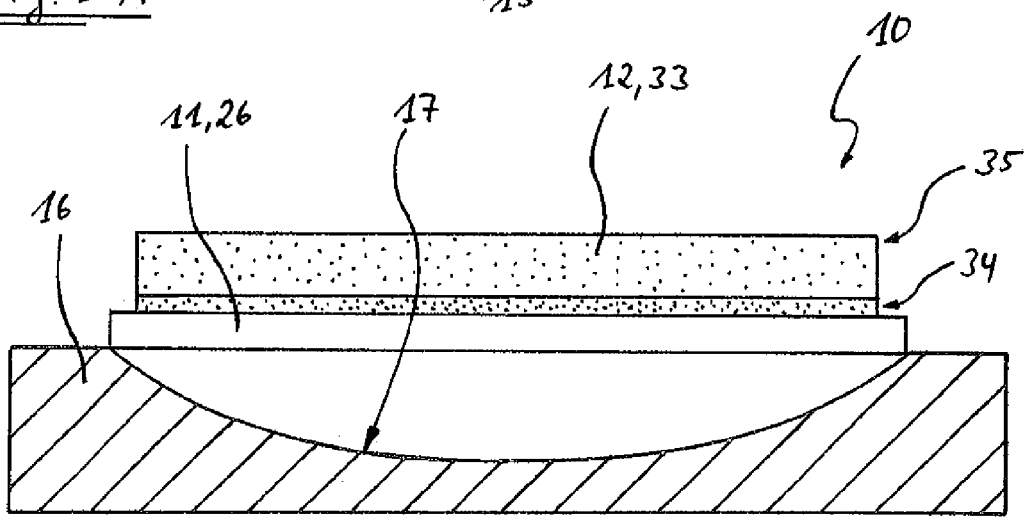

An eleventh embodiment of a method according to the invention for manufacturing a structural assembly 6, in particular a reinforced shell component 4, 5 for an aircraft 1 is to be explained by way of FIGS. 15A to 15F. In this embodiment too, a first assembly component 11 in the form of a shell skin 26 and a second assembly component 12 in the form of a stringer 33 are provided. The stringer 33 is produced as a composite component, reinforcing fibres, in particular glass fibres, carbon fibres or Zylon fibres, being embedded in a matrix of thermoplastic plastics material. In this embodiment too, the fibres may extend in a plurality of directions within the matrix with respect to the longitudinal direction of the stringer 33, so as advantageously to absorb the loads acting on the stringer 33 in the finished structural assembly 6. As is shown in FIG. 15A, the stringer 33 is arranged on the shell skin 26, in turn forming an arrangement 10. The arrangement 10 is placed on a mould 16, the surface 17 of the mould being provided with a geometry which substantially corresponds to a surface geometry of the assembly to be produced when finished. The shell skin 26 is made of an AlMgSc alloy and with a thickness in the range of 0.8 mm to approximately 6 mm.

Figure 15C:
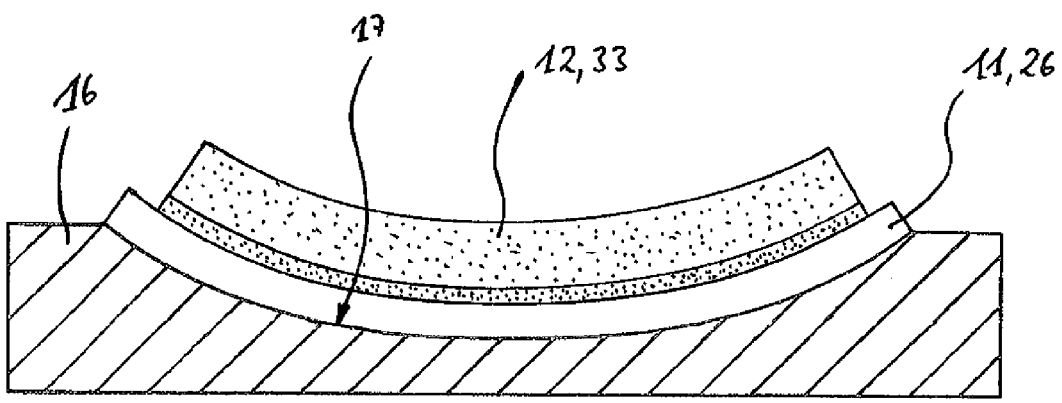
Figure 15D:
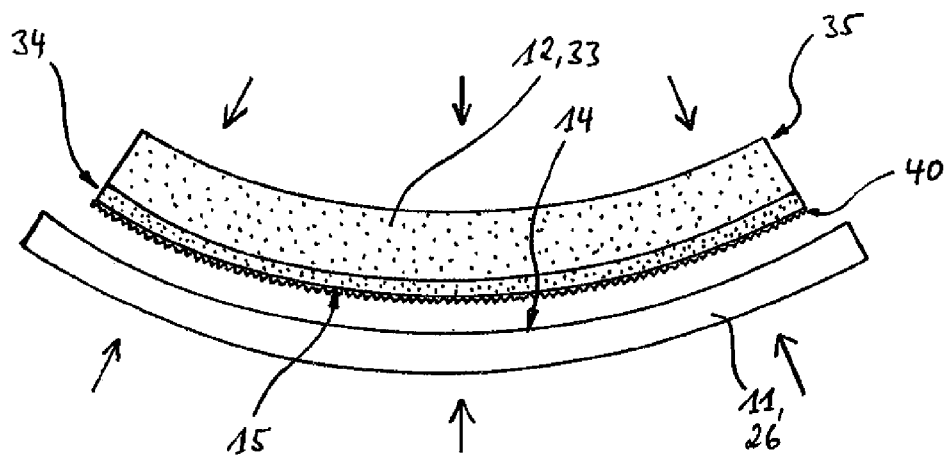
FIG. 15D shows a further process of a method for manufacturing a structural assembly in accordance with the eleventh embodiment, which follows on from the steps of FIGS. 15A-C.

In the method step shown in FIG. 15C in accordance with the eleventh embodiment of the invention, the arrangement 10 is deformed under the action of heat and pressure and/or mechanical forces until the first assembly component 11 is positioned on the surface 17 of the mould 16. This in turn takes place in a furnace or autoclave at a temperature of between 275° C. and 375° C., for example at 320° C. or 350° C. The temperature is maintained for a particular period, preferably longer than ten minutes. This results in creep of the metal shell skin 26, causing it to be subjected to creep forming. In turn, the combination of the deformation temperature and material selection means that substantially no "spring-back" occurs after the deformation process.

In the eleventh embodiment, the thermoplastic plastics material of the matrix of the stringer 33 and the temperature at which the creep forming takes place are further selected in such a way that the matrix of the stringer 33 is not melted during the deformation. Instead, in this embodiment of the invention, the stringer 33 can be deformed by moderate softening, and can in this context be brought into the desired shape together with the shell skin 26 during the creep forming thereof (known as "thermoforming" the stringer 33). In the eleventh embodiment, the first and second assembly component 11, 12 are not yet connected during the creep forming. If the stringer 33 and the shell skin 26 are removed from the mould 16 after the cooling and the removal of pressure and/or applied deformation force, the shell skin 26 and the stringer 33 have the desired geometry for the finished structural assembly 6 and are furthermore advantageously matched exactly to one another in the same method step as a result of the deformation. The shell skin 26 and the stringer 33 remain matched to one another after being removed from the mould 16, since no resilience or "spring-back" of the shell skin 26 occurs.

Figure 15E:
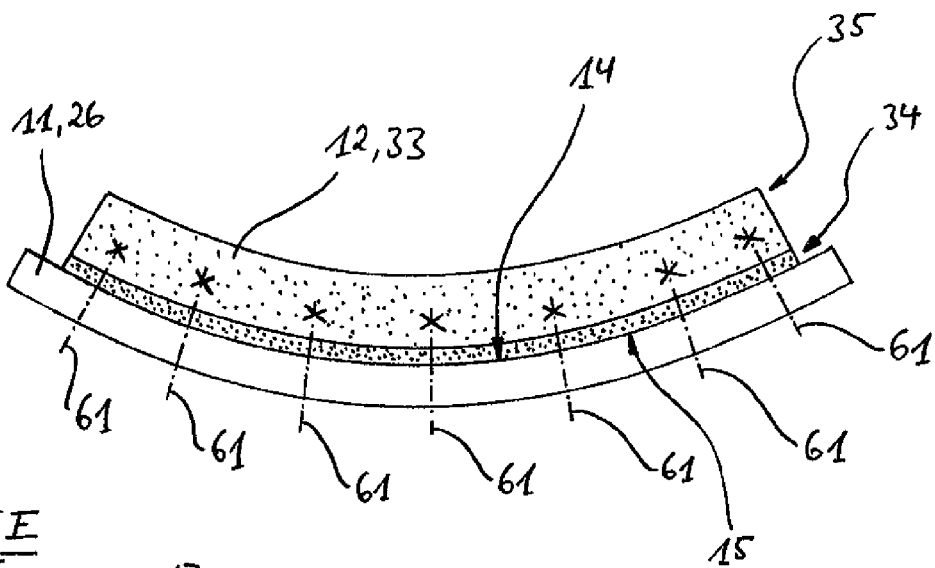
FIG. 15E shows a further process of a method for manufacturing a structural assembly, which takes the place of the step shown in FIG. 15D in a variant of the eleventh embodiment.

In a subsequent step, in accordance with the eleventh embodiment, the deformed shell skin 26 and the stringer 33 are interconnected. In a variant sketched in FIG. 15D, this may take place by gluing, in that for example an adhesive layer 40 is applied to a lower surface 15 of a first limb 34 of the stringer 33, which in this case is L-shaped. Subsequently, the two deformed assembly components 11, 12 can be assembled in the direction of the arrow. After the glue cures, the structural assembly is finished. In an alternative variant, as shown in FIG. 15E, the shell skin 26 and the stringer 33 are interconnected by means of rivets 61 after the creep deformation and the removal from the mould 16.

Figure 15F:
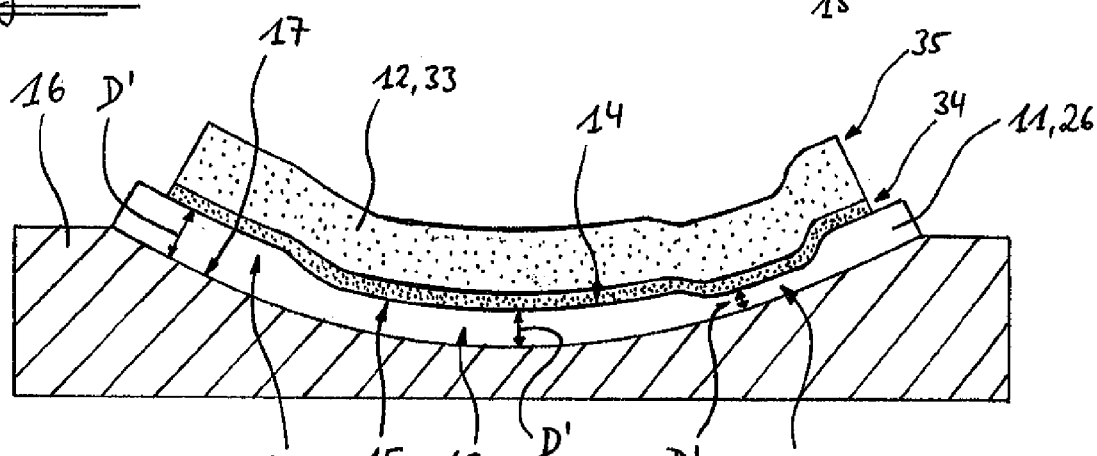
FIG. 15F shows a variant of the method shown in FIG. 15C.

FIG. 15F shows a variant of the step sketched in FIG. 15C of the method. The shell skin 26 can be formed with different thicknesses at different points, for example so as to reduce the total weight thereof. In a first region 62, the shell skin 26 may be of a comparatively high thickness D', whilst this thickness D' may be lower in adjacent regions 63 and 64. During the creep forming, the stringer 33, the matrix of which softens but does not melt at the selected temperature, may advantageously be adapted to the different thicknesses D' of the shell skin 26. After the creep forming and cooling, the stringer 33 and shell skin 26 fit together exactly and can be fastened together in a precise fit, again for example by gluing or riveting. Complex and expensive machining of a stringer to a precise fit can be dispensed with.

Figure 16:
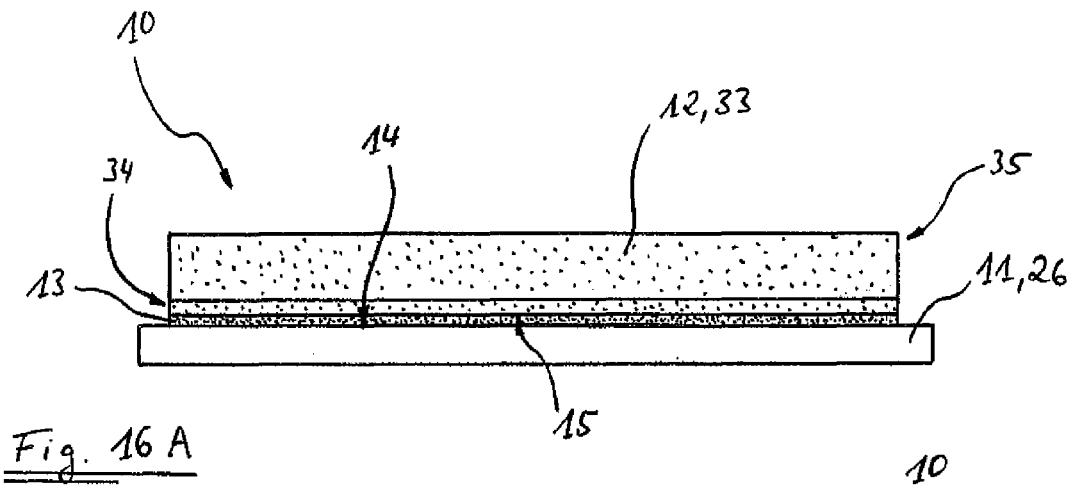
FIGS. 16A-C are sectional views of the manufacture of a structural assembly in accordance with a twelfth embodiment of the invention.
Figure 16:
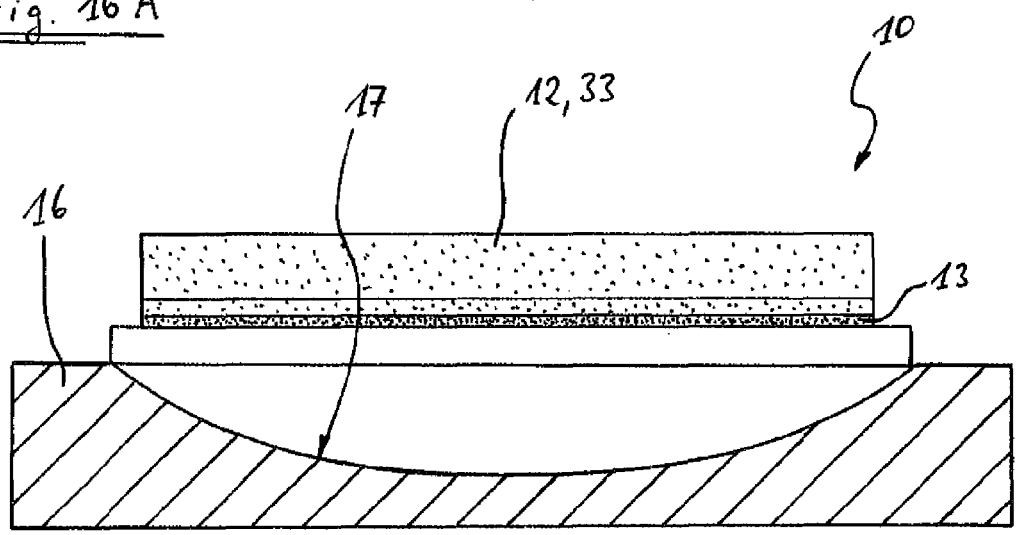
Figure 16:
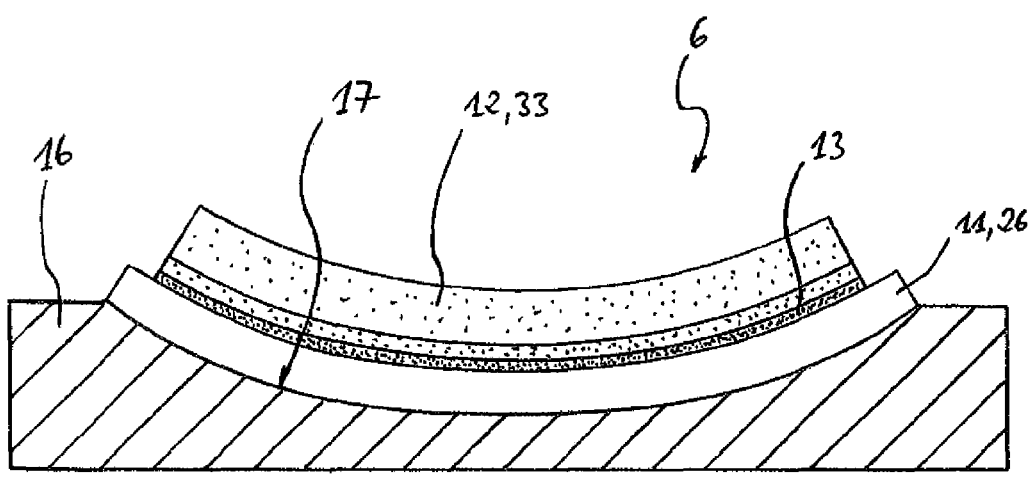

The twelfth embodiment of the invention in accordance with FIGS. 16A to 16C shows a modification of the previously disclosed eleventh embodiment. In this context, when an arrangement 10 is formed, a sheet 13 of a first thermoplastic plastics material 13 is arranged between a first assembly component 11 and a second assembly component 12, by laying a foil or by coating, as disclosed previously in relation to FIGS. 4, 5, 5A, 5B, 6 and 6A. In this context, in particular an upper surface 14 of the shell skin 26, which forms the first assembly component 11, is pre-treated by anodising or applying a conversion coating or a sol gel sheet, as was also disclosed previously in relation to FIGS. 4, 5, 5A, 5B, 6 and 6A. Whilst the shell skin 26 is again made from an AlMgSc alloy having a thickness of 0.8 mm to approximately 6 mm, the stringer 33 which forms the second assembly component 12 is in the form of a composite component, in the matrix of which reinforcing fibres, for example glass fibres, carbon fibres or Zylon fibres, are embedded. In the twelfth embodiment, the matrix of the stringer 33 is formed from a second thermoplastic plastics material, which is different from the first thermoplastic plastics material 13.

The first and second thermoplastic plastics materials are selected in such a way that, when the formed arrangement 10 is subjected to creep forming, the first thermoplastic plastics material 13 between the assembly components 11 and 12 melts at least in part at the temperature selected for the creep forming, so as to interconnect the assembly components 11, 12 permanently. At the same time, the second thermoplastic plastics material of the matrix of the second assembly component 12 softens during the creep forming, without melting. As a result, in this embodiment the second assembly component 12 can likewise be deformed during the creep forming. Thus, in one method step, the shell skin 26 can be subjected to creep forming, the stringer 33 can be thermoformed, and the two can be connected by melting and resolidifying the thermoplastic plastics material 13 arranged between the two. In this embodiment too, the stringer 33 can be adapted to differences in thickness of the shell skin 26, as disclosed in relation to FIG. 15F. The temperature for the creep forming process is again selected between 275° C. and 375° C., and preferably maintained for longer than ten minutes, for example in the range of approximately 30 minutes to one hour.

In the embodiments of FIGS. 15A to 15F and 16A to 16C too, the first assembly component 11 formed as a shell skin 26 can be formed with a plurality of layers, similarly to FIGS. 14A to 14C.

Figure 17:
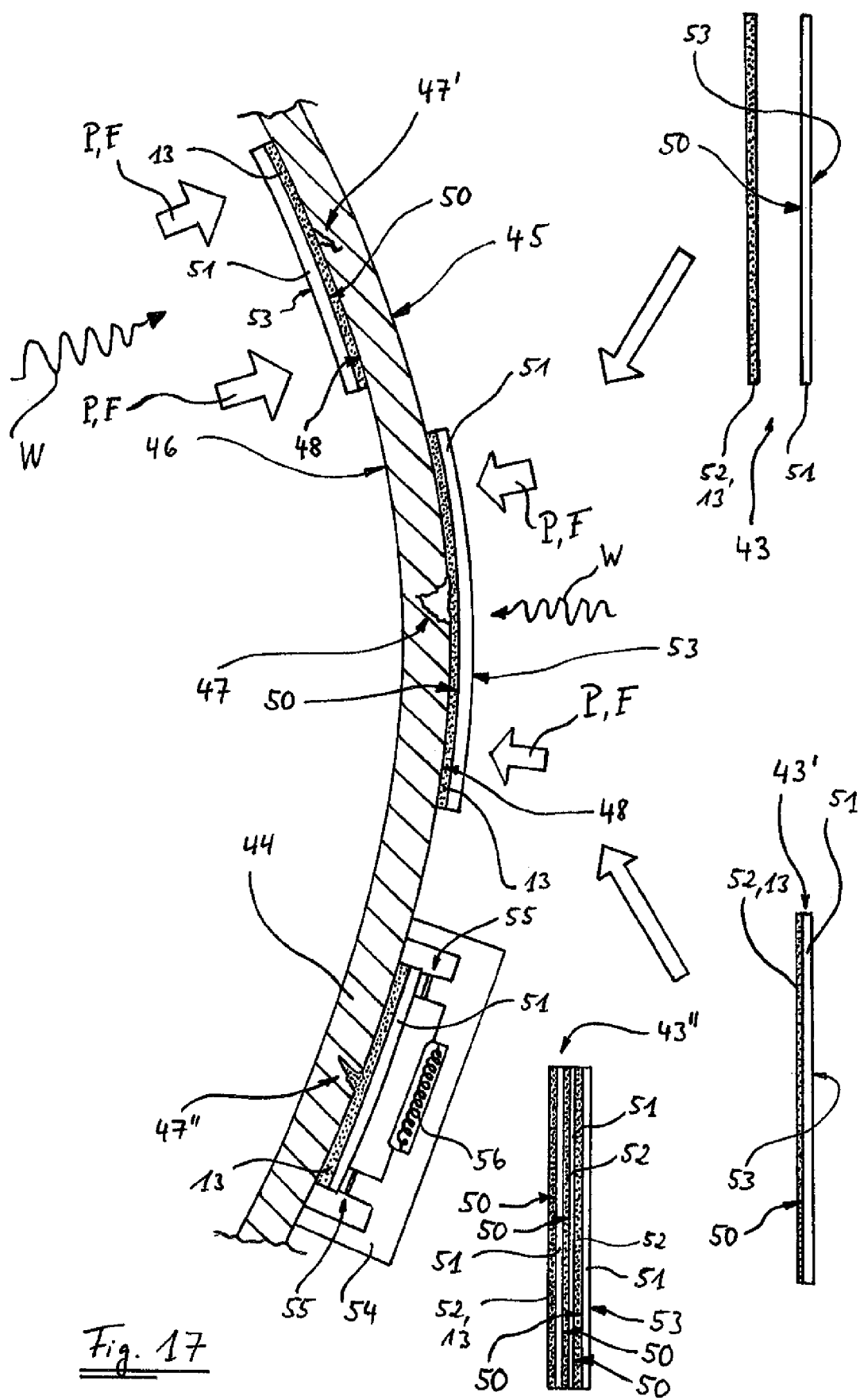
FIG. 17 is a sectional view of the repair of a structural assembly comprising a plurality of damaged spots by means of different embodiments of doubler.

Carrying out a repair method according to a further embodiment of the present invention is shown schematically in FIG. 17. A structural assembly 44, only a portion of which is shown in FIG. 17, comprises a damaged spot 47 and a damaged spot 47" on the outside 45. In this example, the structural assembly 44 further comprises a further damaged spot 47' on the inside 46. The structural assembly 44 may be a fuselage shell 4 or a wing shell 5 of an aircraft, but also a different structural assembly of an aircraft or spacecraft, a structural assembly of a motor vehicle or a structural assembly of a building. The structural assembly 44 in accordance with FIG. 17 is formed with a protuberant shell skin and can be reinforced on the inside 46 with reinforcing members (not shown) such as stringers, formers and the like.

So as to repair the damaged spot 47, 47' or 47", a doubler 43 or alternatively a doubler 43' or 43" is initially provided. In the example shown in FIG. 17, the doubler 43 is in two parts, comprising a layer 51 of a material which can be deformed by creep forming and a sheet 52, formed as a foil, of a thermoplastic plastics material 13. The foil of the thermoplastic plastics material 13 may comprise embedded reinforcing fibres, such as glass fibres, carbon fibres or Zylon fibres or combinations thereof, and already be prefabricated for carrying out the repair method and for example be prepared tailored in standard sizes. Alternatively, the foil may be tailored to the size of the damaged region individually on site. The layer 51 may be in the form of a standard pre-cut part or be tailored individually. In the embodiment shown, the layer 51 is produced as a foil or a thin sheet of an AlMgSc alloy having a thickness of between 0.2 mm and 6.0 mm, preferably between 0.4 mm and 3.8 mm. For the repair, the foil made of the thermoplastic plastics material 13 is laid between the structural assembly 44 and the layer 51.

The doubler 43' which may alternatively be used likewise comprises a layer 51 which is formed from an AlMgSc alloy as in the doubler 43. A surface 50 of the layer 51 is coated in a planar manner with a thermoplastic plastics material 13. This can take place by thermally spraying the thermoplastic plastics material 13 to form a sheet 52 on the layer 51. The doubler 43' is thus tailored in a suitable manner from a semi-finished product comprising a layer 51 coated with the thermoplastic plastics material 13. In this context, it is advantageous that the doubler 43' is a single piece, and thus offers handling advantages during the repair. A further variant of a doubler for repairing the damaged spot 47 47' or 47" is provided with reference numeral 43". The doubler 43" is likewise tailored from a semi-finished product, but comprises a plurality of layers 51 of an AlMgSc alloy, a sheet 52 of a thermoplastic plastics material 13 being provided between every two layers 51. In the doubler 43" too, as in the doubler 43', a surface 53 of an uppermost layer 51 is exposed, whilst a sheet 52 of the thermoplastic plastics material 13 is exposed on the opposing underside of the doubler 43". In the single-piece doublers 43' and 43" too, reinforcing fibres of the aforementioned types may be embedded in the thermoplastic plastics material to improve the mechanical properties of the doubler 43', 43".

So as to repair the damaged spot 47, 47' or 47", a doubler 43, 43' or 43" is placed on the structural assembly 44 in such a way that the doubler 43, 43' or 43" covers the damaged spot 47, 47' or 47", preferably completely. In this context, the respective outer layer 52 of the thermoplastic plastics material 13 which faces the structural assembly 44 is positioned against the outside 45 or the inside 46 of the structural assembly 44 at least in part.

The doublers 43, 43', 43" and the semi-finished products from which the doublers 43, 43', 43" are produced may be prefabricated as planar material. However, structural assemblies 44 of aircraft or spacecraft are often curved in a plurality of spatial dimensions. As a result the doubler 43, 43', 43" does not initially rest in full surface contact on the structural assembly 44. So as to achieve complete contact, a pressure P and/or a force F is applied to the doubler 43, 43', 43", for example by means of a suitable tensioning device. Subsequently, the doubler 43, 43', 43" is heated by means of a suitable, preferably movable heating means to a temperature at which the thermoplastic plastics material at least of the sheet 52 positioned on the structural assembly 44 melts at least in part. In this context, a portion of the structural assembly 44 is preferably also heated. The temperature may for example be between 275° C. and 375° C. and is maintained for a predetermined time, for example more than ten minutes. In this context, the layers 51 are deformed by the material creeping. Subsequently, it is ensured that the structural assembly 44 and the doubler 43, 43', 43" can cool again, the melted thermoplastic plastics material 13 solidifying again and the layer 51 and thus the entire doubler 43, 43', 43" being permanently and reliably connected to the structural assembly 44 in this manner. Advantageously, in this context part of the melted thermoplastic plastics material 13 may also fill out smaller damaged spots 47", such as smaller tears, notches and the like. In this embodiment, the structural assembly 44 to be repaired likewise consists of an AlMgSc alloy, meaning that the mechanical properties of the structural assembly 44 do not suffer during heating.

FIG. 17 shows schematically a movable tensioning and heating means 54, comprising tensioning members 55 for applying forces F to the doubler 43, 43', 43" and comprising a heating member 56 for introducing heat W, being used for repairing the damaged spot 47" on the outside 45 of the structural assembly 44. The repair method disclosed with reference to FIG. 17 may for example be used in routine maintenance and servicing of an aircraft 1 for repairing lesser damage to the outer skin of the fuselage 2. Damaged spots 47' on the inside 46 can also be repaired.

In the repair method of FIG. 17 too, the surface of the structural assembly 44 is pre-treated in portions, at least in a region around the damaged spot in which the doubler is laid, preferably by cleaning and degreasing and by anodising or applying a conversion coating or a sol gel sheet, so as to improve the adhesion of the thermoplastic plastics material. This also applies to the surfaces 50 of the layer 51 or plurality of layers 51 which come into contact with the thermoplastic plastics material.

As regards the pre-treatment of the surfaces of the assembly components or layers, the selection of the temperatures, the application of the forces F and the pressure P, and the selection of the mould 16, what was stated previously for the first embodiment also applies to the second to twelfth embodiments, it being possible to dispense with the pre-treatment in the eleventh embodiment since no connection takes place by means of the thermoplastic plastics material during the deformation. In the first to twelfth embodiments, the heat may be applied in a furnace or in an autoclave, into which the mould 16 and the arrangement 10 to be deformed or stack 20 to be deformed is inserted.

In all of the disclosed embodiments, a high-performance thermoplastic, in particular a polyaryletherketone (PAEK), a polyetheretherketone (PEEK), a polyetherketone (PEK), a polyetherimide (PEI) or a polyamideimide (PAI), is used as the thermoplastic plastics material for films or foils which are to be inserted, for coating and/or for the matrix of a composite component. However, it is also conceivable to use other thermoplastic plastics materials. The thermoplastic plastics material is provided with a dotted pattern in the drawings for improved clarity. The films or foils or the coatings have a thickness which is preferably in a range of 0.05 mm to 0.3 mm.

The above description of the embodiments of the invention makes reference to drawings in which the mould 16 is shown in section in each case. In this context, only a substantially cylindrical, two-dimensional curvature of the moulding surface 17 of the mould 16 can be seen. However, it is understood that the mould 16 may be provided with any desired forming surface 17, which may also be curved in a plurality of spatial directions. The produced structural assembly 6 and the produced semi-finished product 7 may thus also be curved in a plurality of spatial directions, and thus comprise any desired three-dimensionally shaped surfaces, such as are found in particular in shell components for modern aircraft.

Although the present invention was disclosed in the above by way of preferred embodiments, it is not limited thereto, but can be modified in a variety of ways.

For example, the present invention may be used not only in the field of aviation and space travel, but also in vehicle or construction technology, for example when producing vehicle body parts or building assemblies.

The present invention provides a method for manufacturing a structural assembly comprising at least two assembly components interconnected by means of a thermoplastic plastics material and may be used in particular in the field of aviation or space travel. In a first method step, a first assembly component and a second assembly component are provided and arranged so as to form an arrangement. In a further step, the arrangement is subjected to creep forming at a temperature which is selected in such a way that the thermoplastic plastics material melts at least in part during the creep forming, so as to connect the first assembly component and the second assembly component. Furthermore, the invention provides a further method for manufacturing a structural assembly, a method for manufacturing a semi-finished product for producing a structural assembly by subjecting the semi-finished product to creep forming, and a repair method for a structural assembly comprising a damaged spot. The invention further relates to structural assemblies, in particular for an aircraft or spacecraft, to an aircraft or spacecraft comprising a structural assembly of this type, to a semi-finished product for manufacturing a structural assembly by subjecting the semi-finished product to creep forming, and to a semi-finished product for repairing a structural assembly.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for manufacturing a structural assembly comprising at least two assembly components interconnected via a thermoplastic material, the method comprising the following steps:

providing and arranging a first assembly component and a second assembly component so as to form an arrangement, wherein the first assembly component and the second assembly component are formed at least in part from a metal;

pre-treating a surface of at least one of the first and second assembly components, before or after forming the arrangement, by cleaning, degreasing, and either anodizing or applying a conversion coating or a sol gel sheet; and subjecting the arrangement to creep forming at a temperature which is selected in such a way that the thermoplastic material melts at least in part during the creep forming, so as to form a layer of adhesive between the first assembly component and the second assembly component and connect the first assembly component and the second assembly component by adhesion, the temperature being selected in a range of 275° C. to 325° C.;

wherein the structural assembly that is manufactured is in the form of a shell assembly, wherein the first assembly component forms a shell skin produced from an aluminum magnesium scandium alloy, wherein the second assembly component forms a stringer as a reinforcing member for the shell skin or the second assembly component is in the form of a fastening member, of a doubler or of a window frame.

2. The method according to claim 1, wherein the creep forming takes place by way of a mould, which has a surface, the geometry of which substantially corresponds to a target geometry of the structural assembly.

3. The method according to claim 1, wherein the thermoplastic material is laid between the first assembly component and the second assembly component as a film or foil during the formation of the arrangement, the thickness of the film or foil being in a range of 0.1 to 0.6 mm.

4. The method according to claim 1, comprising coating at least one of the first assembly component and the second assembly component at least in portions with the thermoplastic material before forming the arrangement.

5. The method according to claim 1, wherein, one of before the arrangement is formed or during the creep forming, reinforcing fibres are embedded in the thermoplastic material.

6. The method according to claim 1, wherein during the creep forming the arrangement is exposed to the temperature for a period of ten minutes or longer.

7. The method according to claim 1, wherein the first assembly component is formed from a semi-finished product comprising a plurality of layers of a material which is deformable by creep forming, between which a sheet of a further thermoplastic material is arranged, the composition of which either corresponds to or differs from that of the thermoplastic material, the first assembly component being deformed during the creep forming.

8. The method according to claim 1, wherein at least one of the first assembly component and the second assembly component are at least two-dimensionally curved.

9. The method according to claim 1, wherein the stringer is produced from an aluminum magnesium scandium alloy.

10. The method according to claim 1, wherein the window frame is produced from an aluminum magnesium scandium alloy.

* * * * *